(12) United States Patent
Rout et al.

(10) Patent No.: US 12,067,023 B2
(45) Date of Patent: Aug. 20, 2024

(54) MACHINE LEARNING TECHNIQUES FOR EFFICIENT DATA PATTERN RECOGNITION ACROSS DATABASES

(71) Applicant: Optum, Inc., Minnetonka, MN (US)

(72) Inventors: Swapna Sourav Rout, Bangalore (IN); Ankit Varshney, Delhi (IN); Sudeep Choudhary, Jharia (IN); Ravi Kumar Raju Gottumukkala, Bengaluru (IN); Sreedhar Terala, Maple Grove, MN (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 17/412,651

(22) Filed: Aug. 26, 2021

(65) Prior Publication Data

US 2023/0062114 A1    Mar. 2, 2023

(51) Int. Cl.
| G06F 17/00 | (2019.01) |
| G06F 16/25 | (2019.01) |
| G06F 16/28 | (2019.01) |
| G06F 18/214 | (2023.01) |
| G06F 18/22 | (2023.01) |
| G06N 20/00 | (2019.01) |

(52) U.S. Cl.
CPC ............ *G06F 16/25* (2019.01); *G06F 16/285* (2019.01); *G06F 18/214* (2023.01); *G06F 18/22* (2023.01); *G06N 20/00* (2019.01)

(58) Field of Classification Search
CPC ...... G06F 16/25; G06F 16/285; G06F 16/906; G06F 18/214; G06F 18/22; G06K 9/6215; G06K 9/6256; G06N 20/00; G06N 3/0464; G06N 3/09

See application file for complete search history.

(56) References Cited

U.S. PATENT DOCUMENTS

| 6,990,628 | B1 | 1/2006 | Palmer et al. |
| 8,276,065 | B2 | 9/2012 | Huang et al. |
| 8,924,340 | B2 | 12/2014 | Cui et al. |
| 9,721,009 | B2 | 8/2017 | Trivedi et al. |
| 9,785,660 | B2 | 10/2017 | Said et al. |
| 9,916,206 | B2 | 3/2018 | Dornquast et al. |
| 10,198,471 | B2 * | 2/2019 | He .................. G06F 16/951 |
| 10,303,793 | B2 | 5/2019 | Bhagavan et al. |
| 10,387,389 | B2 | 8/2019 | Kabra et al. |

(Continued)

FOREIGN PATENT DOCUMENTS

CN    112241421 A    1/2021

OTHER PUBLICATIONS

Sahay, Tanvi et al. "Schema Matching Using Machine Learning," arXiv Preprint arXiv:1911.11543v1, Nov. 24, 2019, (7 pages).

*Primary Examiner* — Greta L Robinson
(74) *Attorney, Agent, or Firm* — Alston & Bird LLP

(57) ABSTRACT

Various embodiments of the present invention provide methods, apparatus, systems, computing devices, computing entities, and/or the like for performing predictive data analysis with respect to structured data objects. Certain embodiments of the present invention utilize systems, methods, and computer program products that perform predictive data analysis with respect to structured data objects by utilizing at least one of cross-table data similarity score generation machine learning models and various machine learning frameworks for cross-database similarity determination.

14 Claims, 27 Drawing Sheets

(56) References Cited

U.S. PATENT DOCUMENTS

| | | |
|---|---|---|
| 10,445,062 B2 | 10/2019 | Oberbreckling et al. |
| 10,606,869 B2 | 3/2020 | Poteet et al. |
| 10,692,015 B2 * | 6/2020 | Xu .................... G06F 16/211 |
| 11,567,976 B2 * | 1/2023 | Rout .................. G06F 16/288 |
| 2016/0092476 A1 | 3/2016 | Stojanovic et al. |
| 2018/0300296 A1 | 10/2018 | Ziraknejad et al. |

* cited by examiner

| ColA | ColP | ColM | ColX | ColB |
|---|---|---|---|---|
| A1 | P1 | M1 | X1 | B1 |
| A2 | P2 | M2 | X2 | B2 |
| A3 | P3 | M3 | X3 | B3 |
| A4 | P4 | M4 | X4 | B4 |
| A5 | P5 | M5 | X5 | B5 |

| ColA | ColP | ColM | ColF | ColB |
|---|---|---|---|---|
| A1 | E1 | M1 | F1 | B1 |
| A2 | E2 | M2 | F2 | B2 |
| A3 | E3 | M3 | F3 | B3 |
| A4 | E4 | M4 | F4 | B4 |
| A5 | E5 | M5 | F5 | B5 |

$R_n = 20, S_n = 5$
Generated table pair with 5 columns each and column matching of 10%

FIG. 9A

| ColA | ColP | ColM | ColX | ColB |
|---|---|---|---|---|
| A1 | P1 | M1 | X1 | B1 |
| A2 | P2 | M2 | X2 | B2 |
| A3 | P3 | M3 | X3 | B3 |
| A4 | P4 | M4 | X4 | B4 |
| A5 | P5 | M5 | X5 | B5 |

| ColA | ColP | ColM | ColF | ColB |
|---|---|---|---|---|
| A1 | P1 | M1 | F1 | B1 |
| A2 | P2 | M2 | F2 | B2 |
| A3 | P3 | M3 | F3 | B3 |
| A4 | P4 | M4 | F4 | B4 |
| A5 | P5 | M5 | F5 | B5 |

$R_n = 40, S_n = 5$
Generated table pair with 5 columns each and column matching of 40%

FIG. 9B

| ColA | ColP | ColM | ColX | ColB |
|---|---|---|---|---|
| A1 | P1 | M1 | X1 | B1 |
| A2 | P2 | M2 | X2 | B2 |
| A3 | P3 | M3 | X3 | B3 |
| A4 | P4 | M4 | X4 | B4 |
| A5 | P5 | M5 | X5 | B5 |

| ColA | ColP | ColM | ColF | ColB |
|---|---|---|---|---|
| A1 | E1 | M1 | F1 | B1 |
| A2 | E2 | M2 | F2 | B2 |
| A3 | E3 | M3 | F3 | B3 |
| A4 | E4 | M4 | F4 | B4 |
| A5 | E5 | M5 | F5 | B5 |

$R_n = 100, S_n = 5$
Generated table pair with 5 columns each and column matching of 100%

FIG. 9C

| Generated Table 1 | Generated Table 2 | Matching Score |
|---|---|---|
| $T_{11}$ | $T_{112}$ | 10 |
| $T_{l2}$ | $T_{l4}$ | 5 |
| $T_{l3}$ | $T_{l4}$ | 25 |
| ... | ... | |
| $T_{ln}$ | $T_{lk}$ | 100 |

Training Data

┌─────────────────────────────────────────────────┐
        │       Identify a set of table column pairs       │
        │                      1901                        │
        └─────────────────────────────────────────────────┘
                              │
                              ▼
        ┌─────────────────────────────────────────────────┐
        │  For each table column pair, determine a         │
        │          cross-column name similarity score      │
        │                      1902                        │
        └─────────────────────────────────────────────────┘
                              │
                              ▼
        ┌─────────────────────────────────────────────────┐
        │         Identify a name matching column set      │
        │                      1903                        │
        └─────────────────────────────────────────────────┘
                              │
                              ▼
        ┌─────────────────────────────────────────────────┐
        │  Determine the cross-table column name similarity score │
        │                      1904                        │
        └─────────────────────────────────────────────────┘
```

MACHINE LEARNING TECHNIQUES FOR EFFICIENT DATA PATTERN RECOGNITION ACROSS DATABASES

BACKGROUND

Various embodiments of the present invention address technical challenges related to performing predictive data analysis with respect to structured data objects. Various embodiments of the present invention address the shortcomings of existing structured database systems and disclose various techniques for efficiently and reliably performing predictive data analysis with respect to structured data objects in various structured database systems.

BRIEF SUMMARY

In general, embodiments of the present invention provide methods, apparatus, systems, computing devices, computing entities, and/or the like for performing predictive data analysis with respect to structured data objects. Certain embodiments of the present invention utilize systems, methods, and computer program products that perform predictive data analysis with respect to structured data objects by utilizing at least one of cross-table data similarity score generation machine learning models, unsupervised anomalous table row detection machine learning models, as well as various machine learning frameworks for cross-database similarity determination.

In accordance with one aspect, a method is provided. In one embodiment, the method comprises: identifying, using one or more processors, a first graph-based database representation of the first database, wherein the first graph-based database representation describes one or more first referential key relationships across one or more first table columns of the first database; identifying, using the processor, a second graph-based database representation of the second database, wherein the second graph-based database representation describes one or more second referential key relationships across one or more second table columns of the second database; determining, using the processor, a predicted cross-database structural similarity score based at least in part on the first graph-based database representation and the second graph-based database representation; determining, using the processor, the predicted cross-database similarity score based at least in part on the predicted cross-database structural similarity score; and performing, using the processor, a prediction-based action based at least in part on the noted predicted cross-database similarity score.

In accordance with another aspect, a computer program product is provided. The computer program product may comprise at least one computer-readable storage medium having computer-readable program code portions stored therein, the computer-readable program code portions comprising executable portions configured to: identify a first graph-based database representation of the first database, wherein the first graph-based database representation describes one or more first referential key relationships across one or more first table columns of the first database; identify a second graph-based database representation of the second database, wherein the second graph-based database representation describes one or more second referential key relationships across one or more second table columns of the second database; determine a predicted cross-database structural similarity score based at least in part on the first graph-based database representation and the second graph-based database representation; determine the predicted cross-database similarity score based at least in part on the predicted cross-database structural similarity score; and perform a prediction-based action based at least in part on the predicted cross-database similarity score.

In accordance with yet another aspect, an apparatus comprising at least one processor and at least one memory including computer program code is provided. In one embodiment, the at least one memory and the computer program code may be configured to, with the processor, cause the apparatus to: identify a first graph-based database representation of the first database, wherein the first graph-based database representation describes one or more first referential key relationships across one or more first table columns of the first database; identify a second graph-based database representation of the second database, wherein the second graph-based database representation describes one or more second referential key relationships across one or more second table columns of the second database; determine a predicted cross-database structural similarity score based at least in part on the first graph-based database representation and the second graph-based database representation; determine the predicted cross-database similarity score based at least in part on the predicted cross-database structural similarity score; and perform a prediction-based action based at least in part on the predicted cross-database similarity score.

BRIEF DESCRIPTION OF THE DRAWINGS

Figure 1:
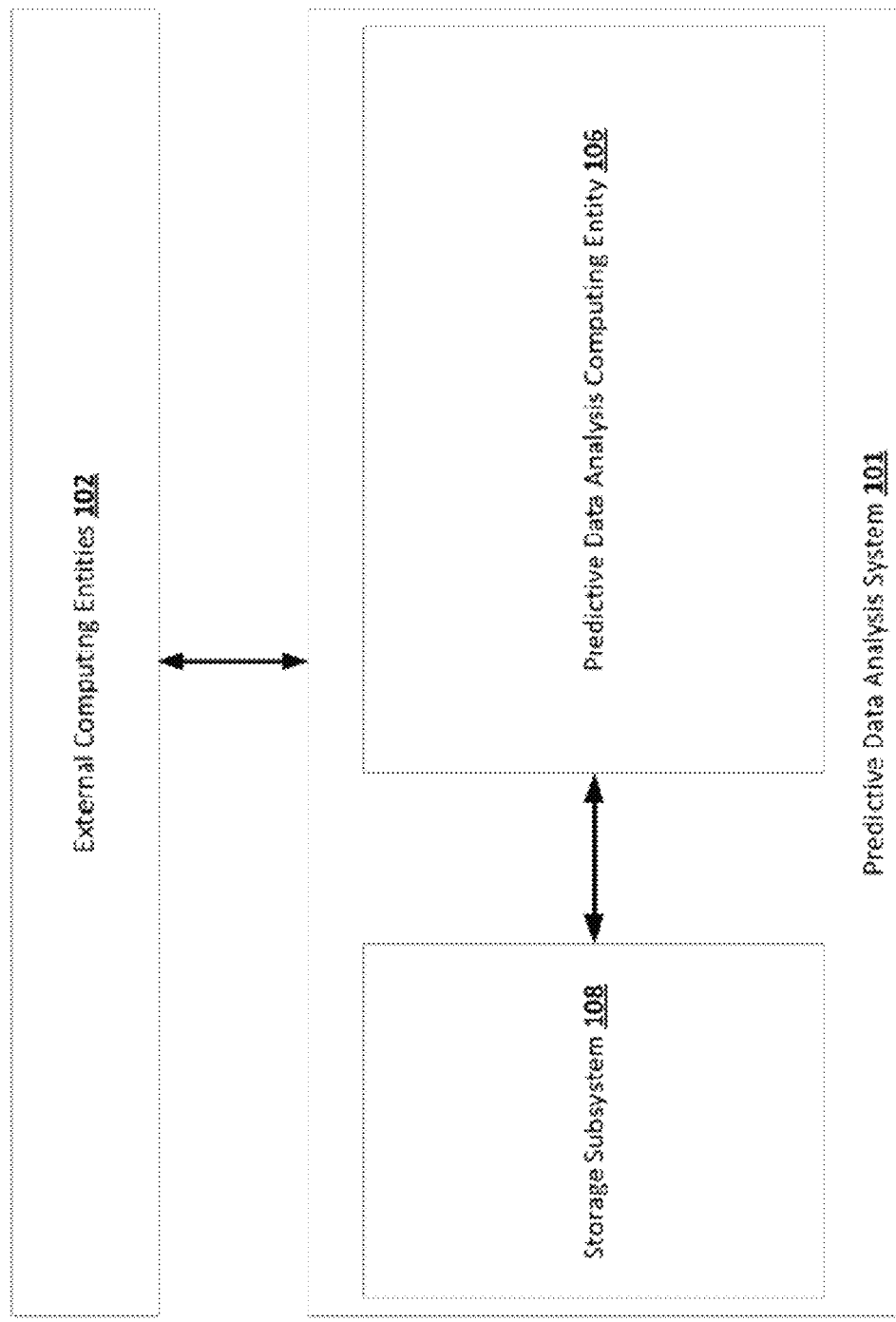

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
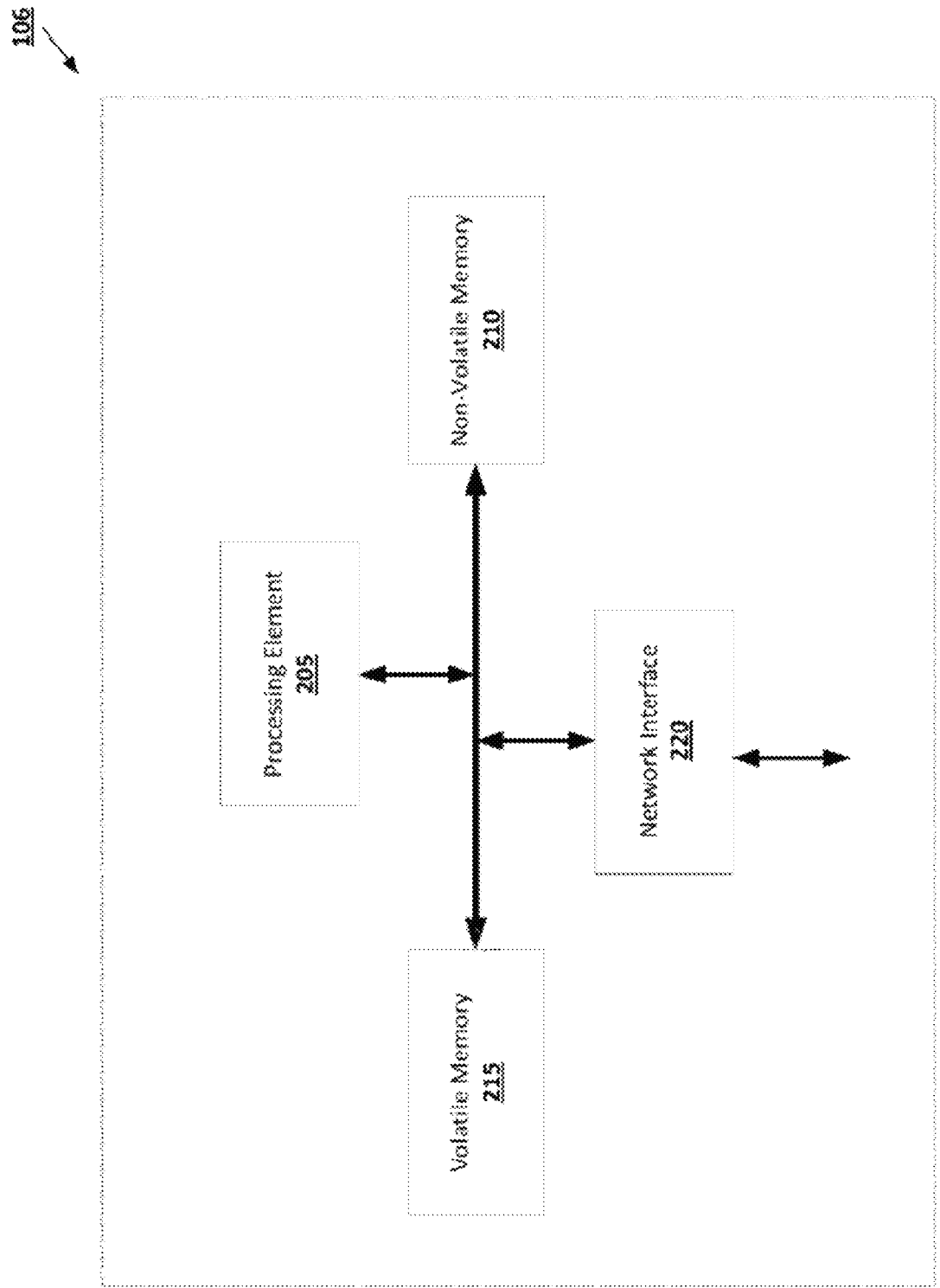

FIG. 2 provides an example predictive data analysis computing entity in accordance with some embodiments discussed herein.

Figure 3:
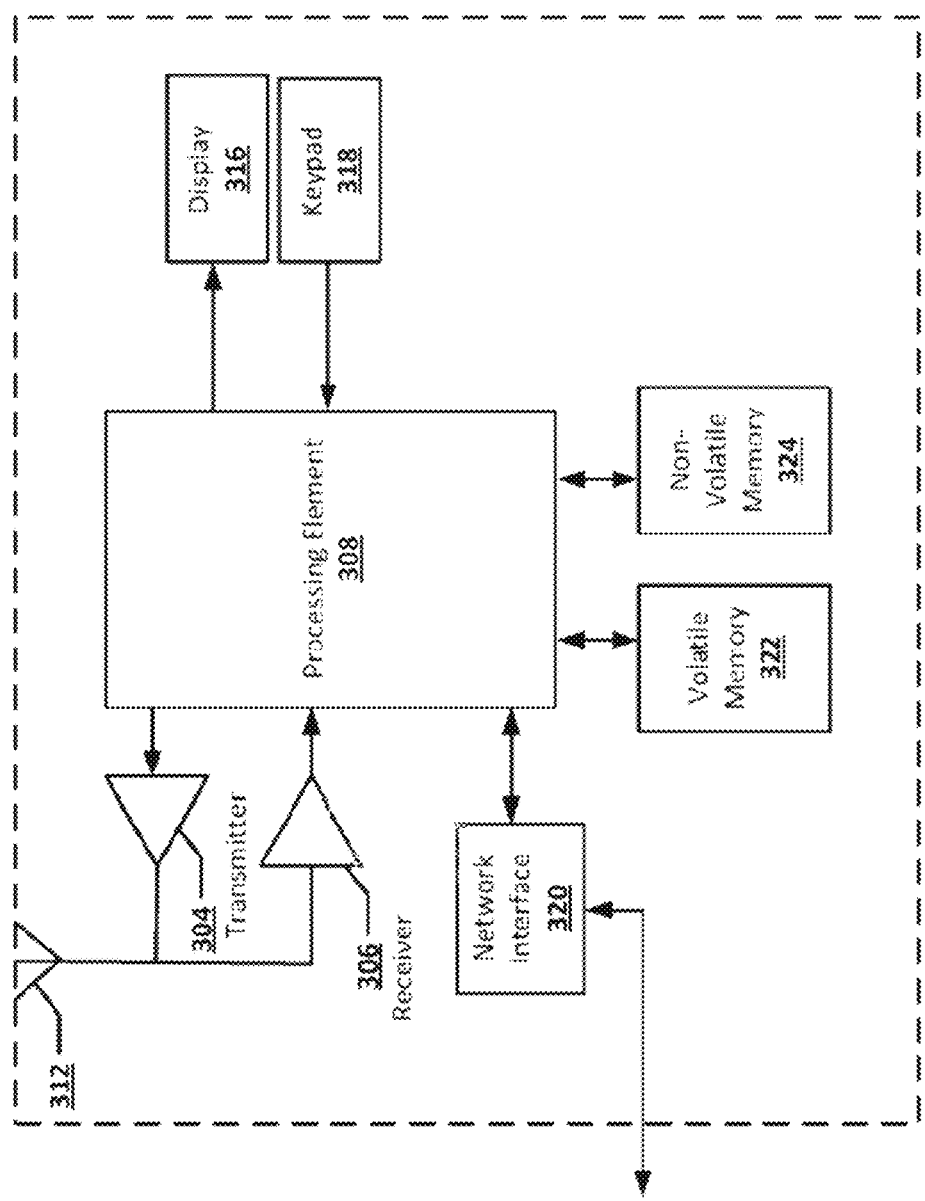

FIG. 3 provides an example external computing entity in accordance with some embodiments discussed herein.

Figure 4:
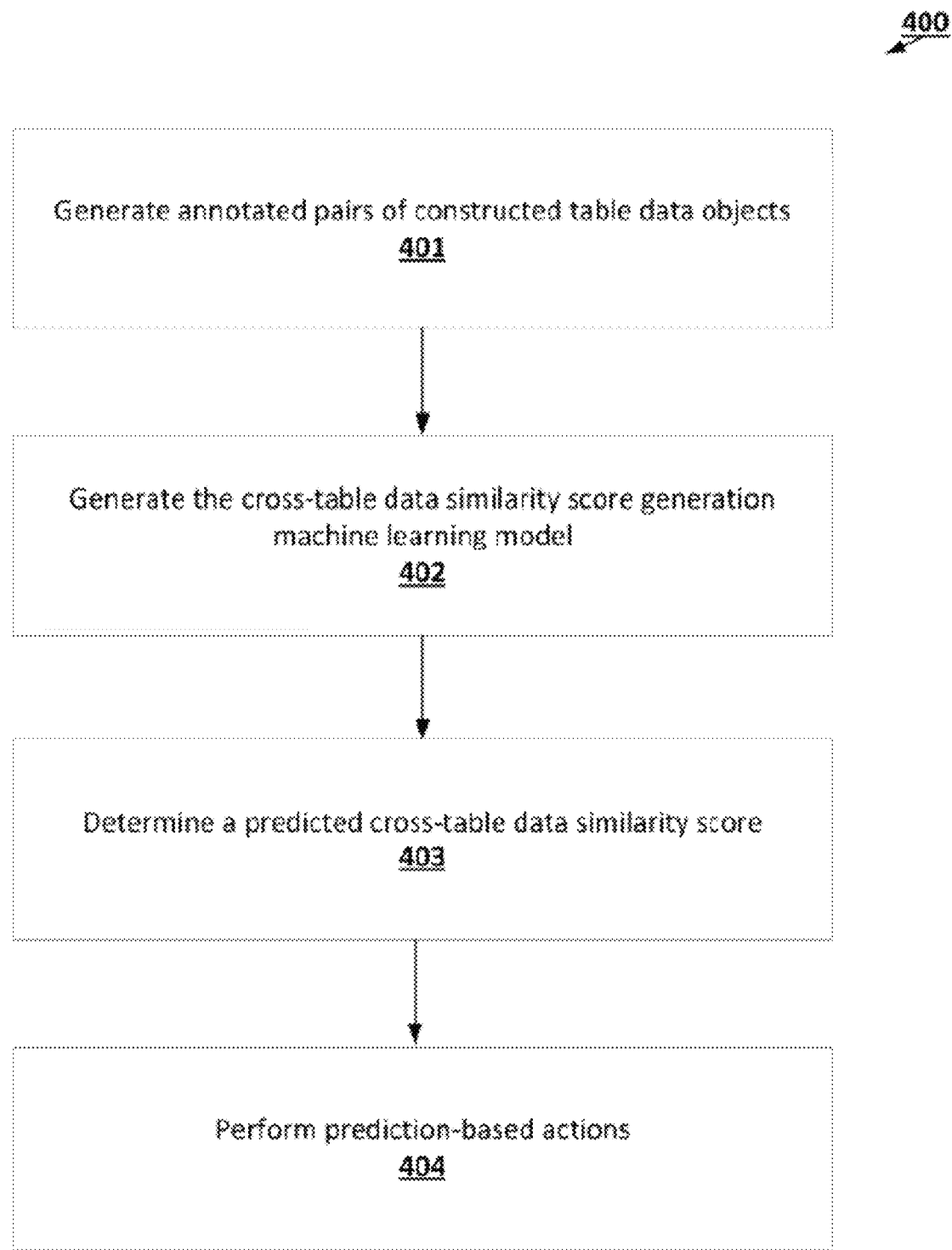

FIG. 4 is a flowchart diagram of an example process for generating a predicted cross-table data similarity score for a first table data object and a second table data object in accordance with some embodiments discussed herein.

Figure 5:
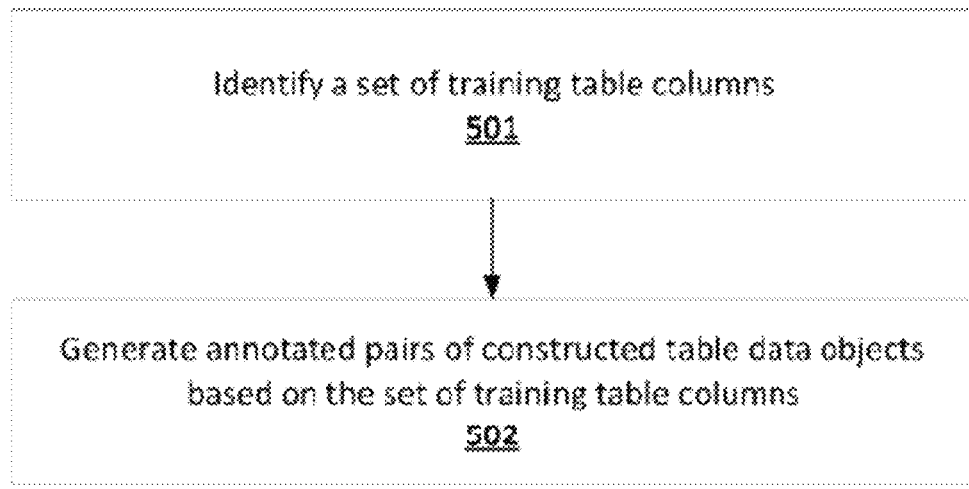

FIG. 5 is a flowchart diagram of an example process for generating annotated pairs of constructed table data objects based at least in part on a set of training databases in accordance with some embodiments discussed herein.

Figure 6:
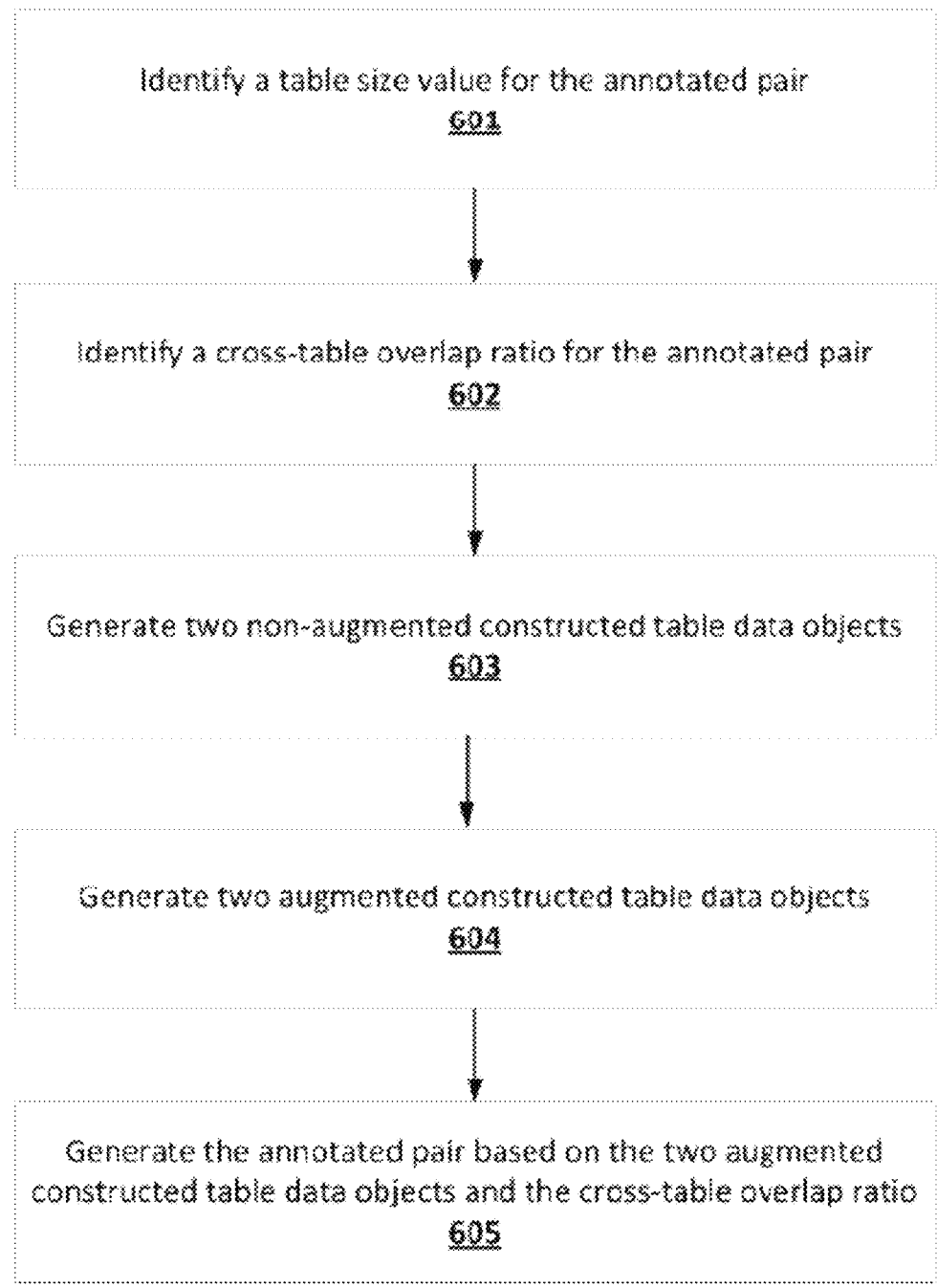

FIG. 6 is a flowchart diagram of an example process for generating an annotated pair of constructed table data objects in accordance with some embodiments discussed herein.

Figure 7:
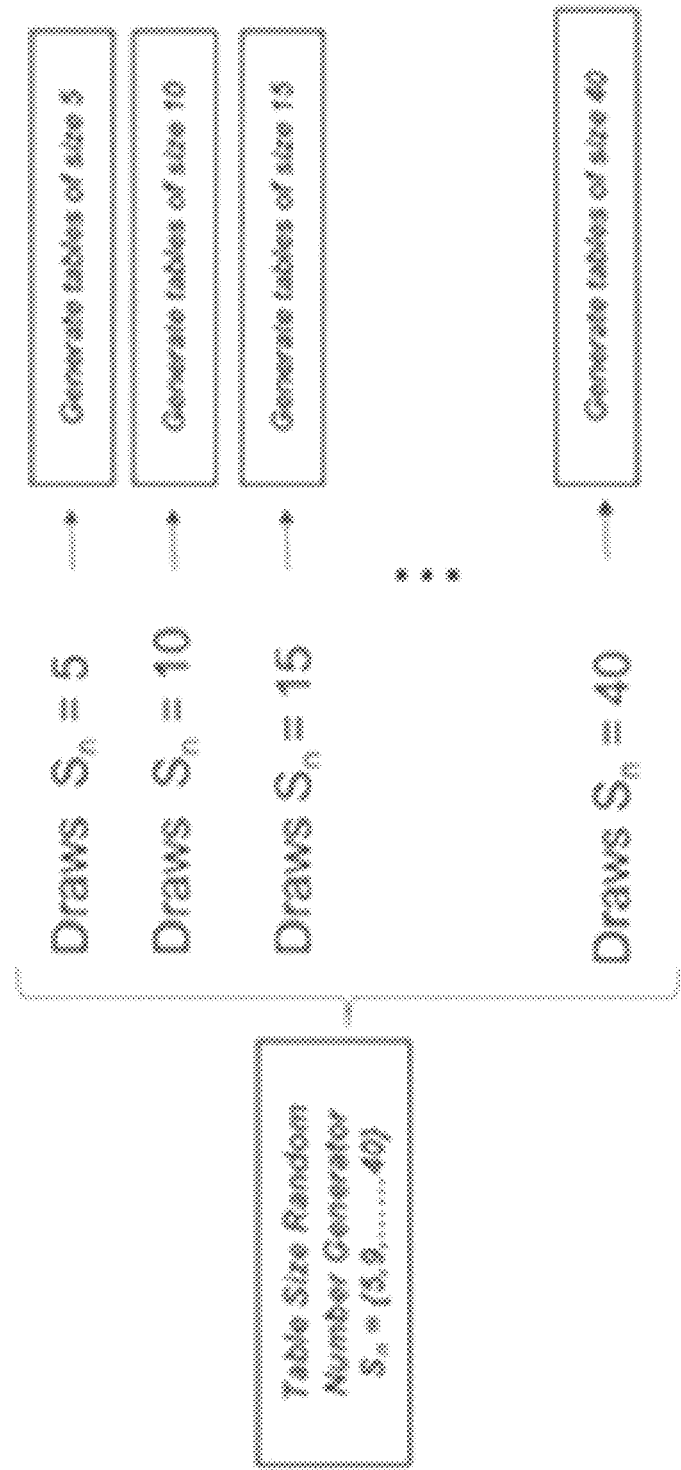

FIG. 7 provides an operational example of generating table size values for constructed table data objects in accordance with some embodiments discussed herein.

Figure 8:
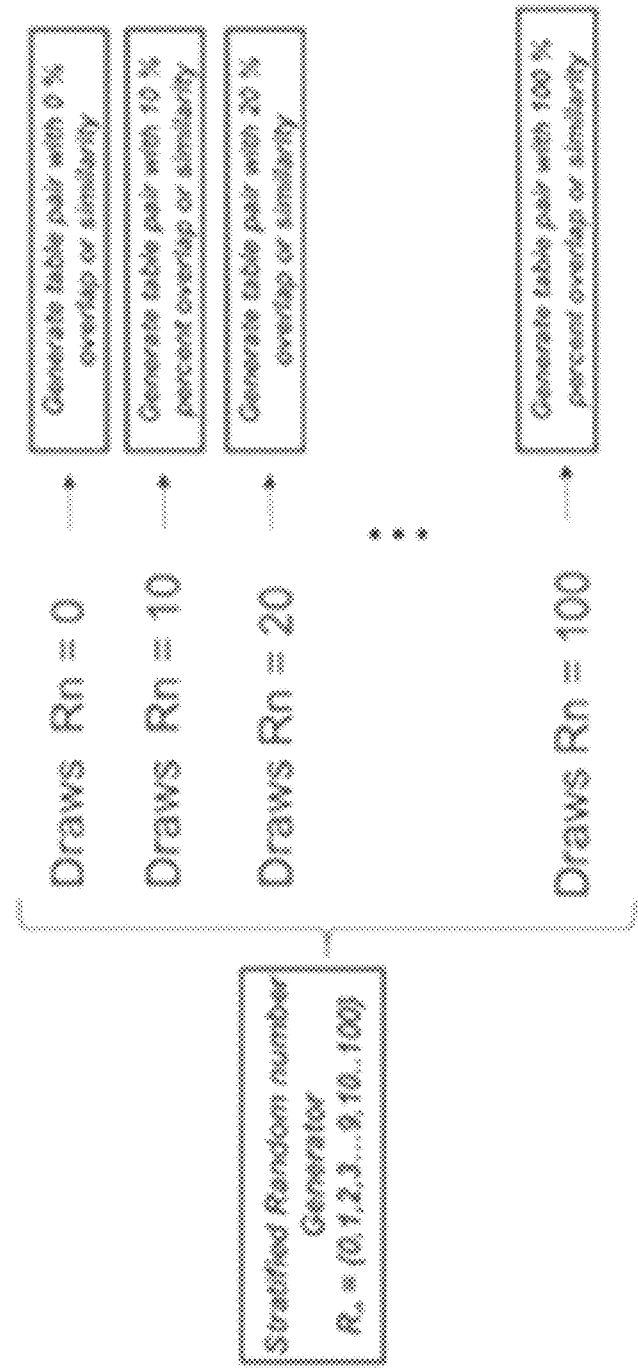

FIG. 8 provides an operational example of generating cross-table overlap ratios for constructed table data objects in accordance with some embodiments discussed herein.

FIGS. 9A-9C provide operational example of generating pairs of constructed table data objects based at least in part on table size values and cross-table overlap ratios in accordance with some embodiments discussed herein.

Figure 10:
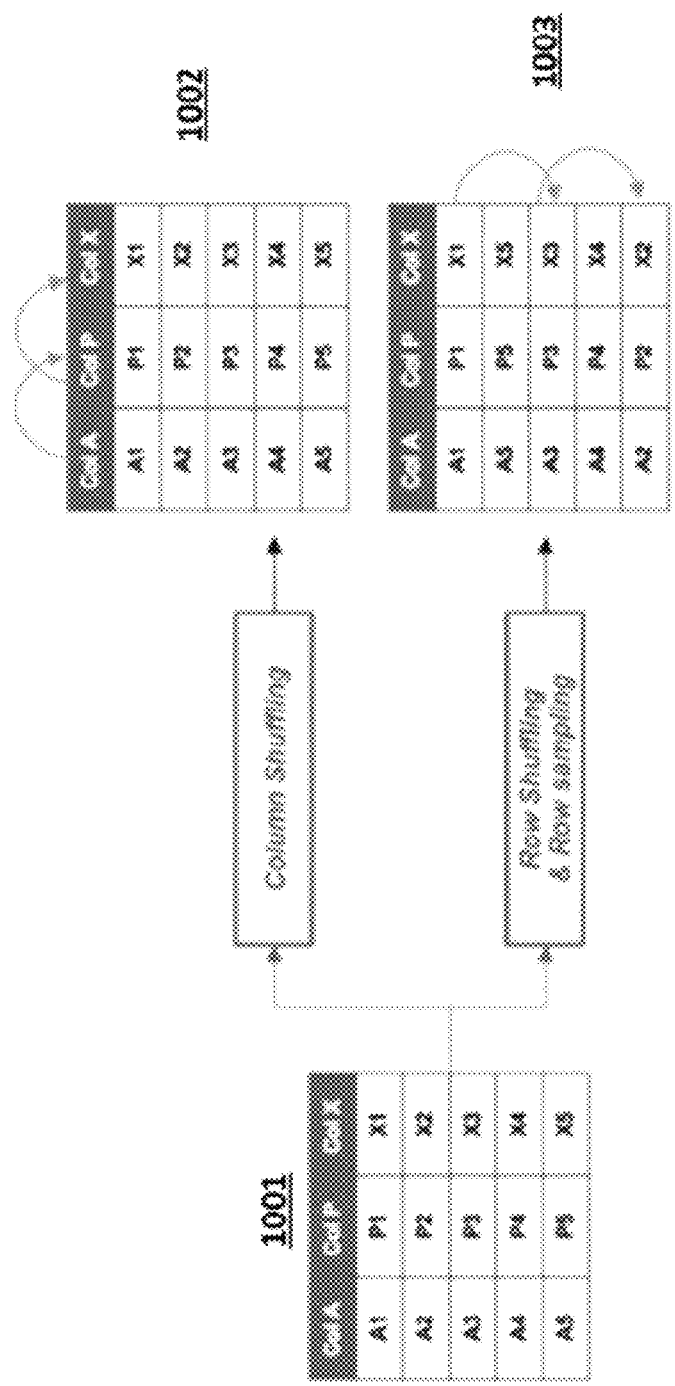

FIG. 10 provides an operational example of performing table row-wise shuffling operations and table column-wise shuffling operations to generate an augmented constructed table data object in accordance with some embodiments discussed herein.

FIG. 11 provides an operational example of a set of annotated pairs of constructed table data objects in accordance with some embodiments discussed herein.

Figure 12:
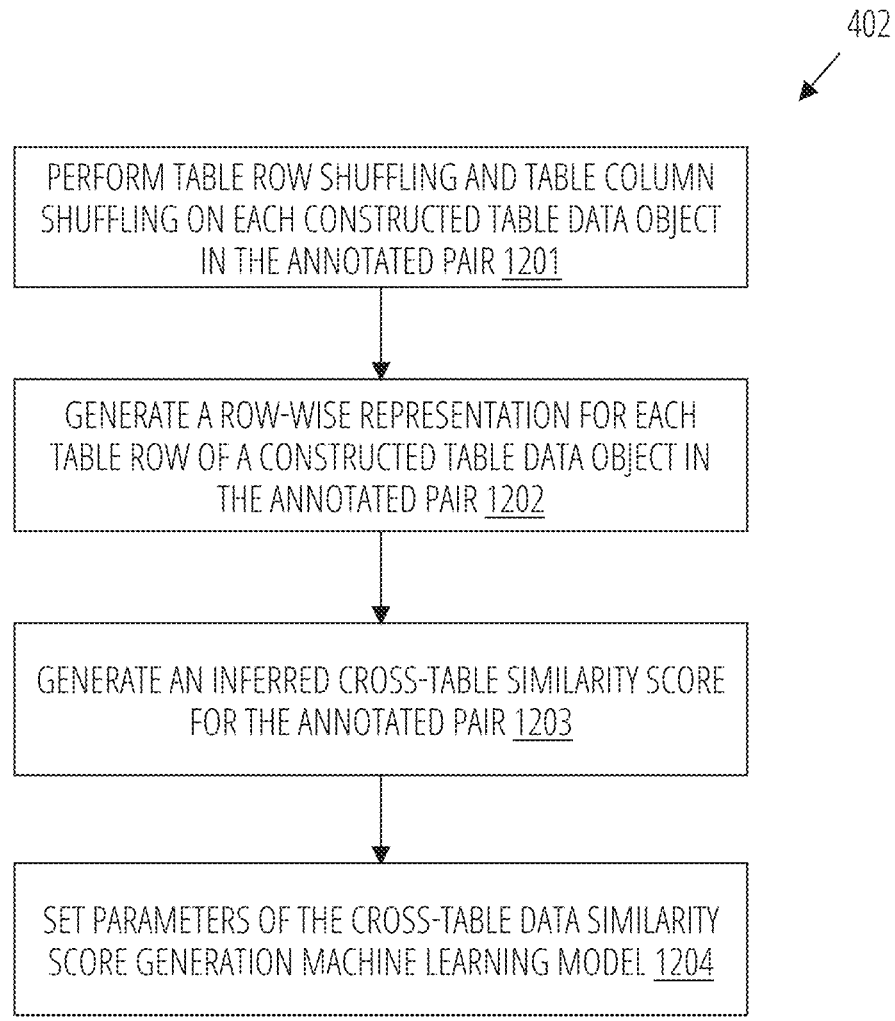

FIG. 12 is a flowchart diagram of an example process of training a cross-table data similarity score generation machine learning model based at least in part on an annotated pair of constructed table data objects in accordance with some embodiments discussed herein.

Figure 13:
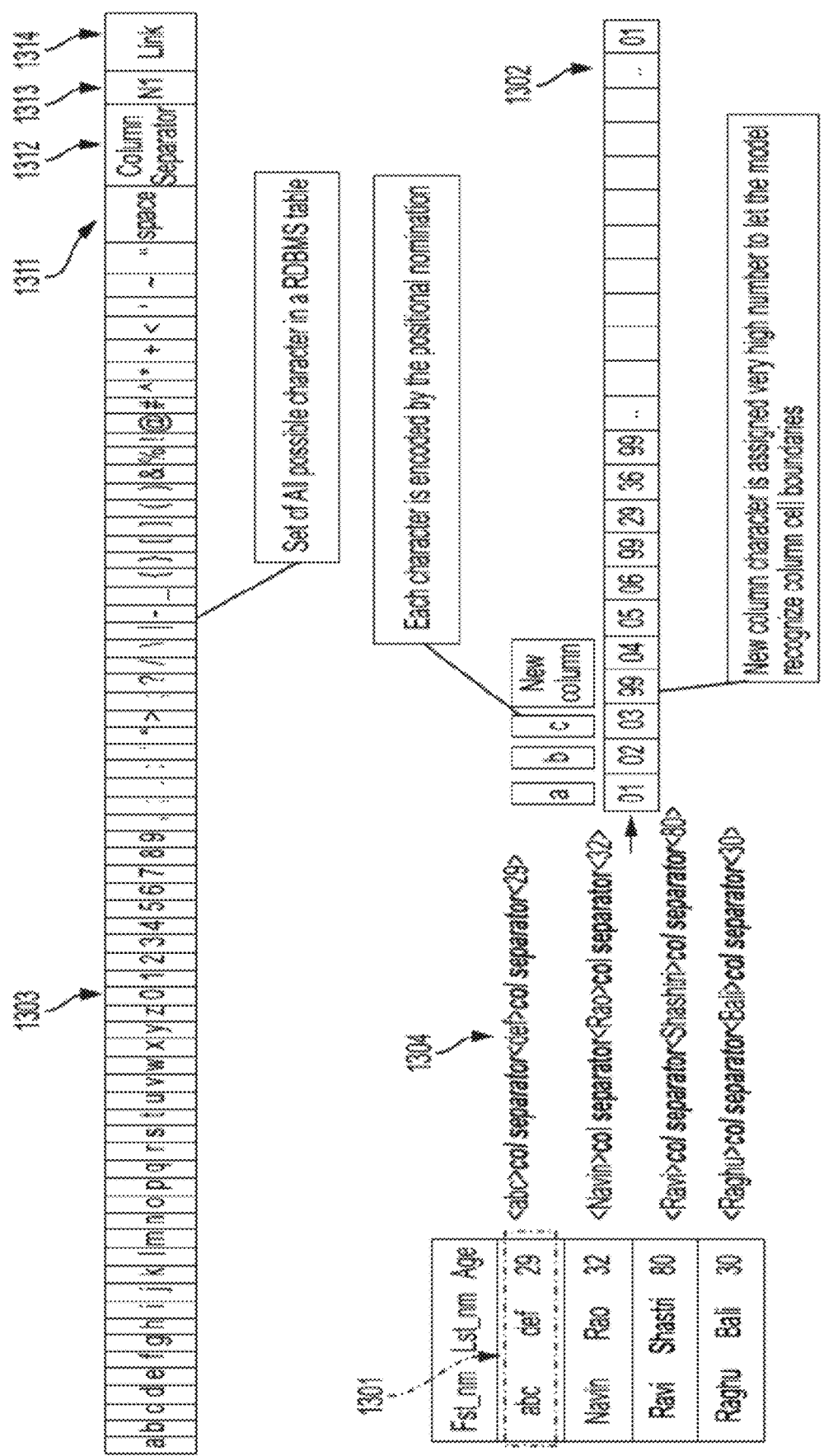

FIG. 13 provides an operational example of generating row-wise representations based at least in part on a character encoding scheme in accordance with some embodiments discussed herein.

Figure 14A:
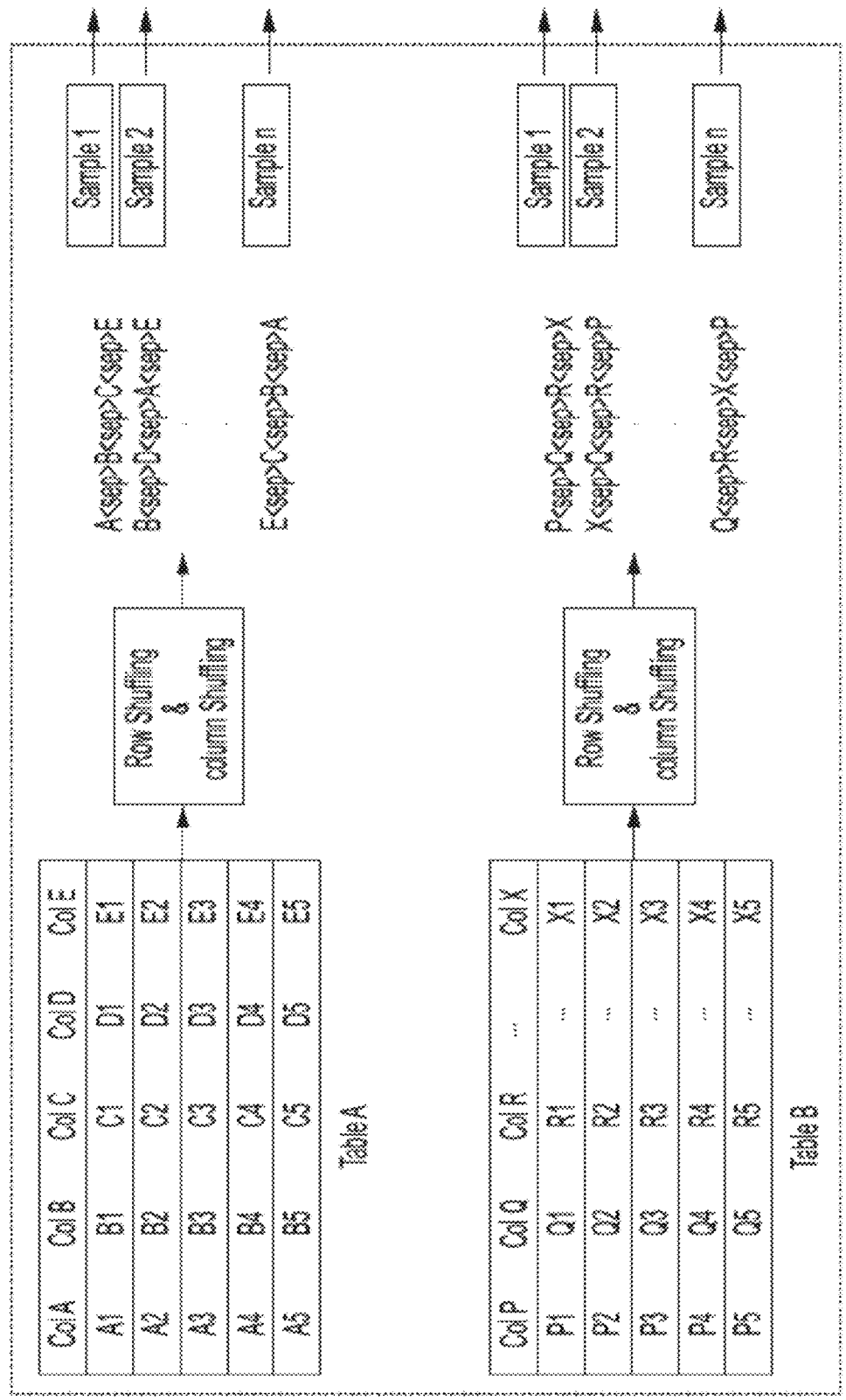
Figure 14B:
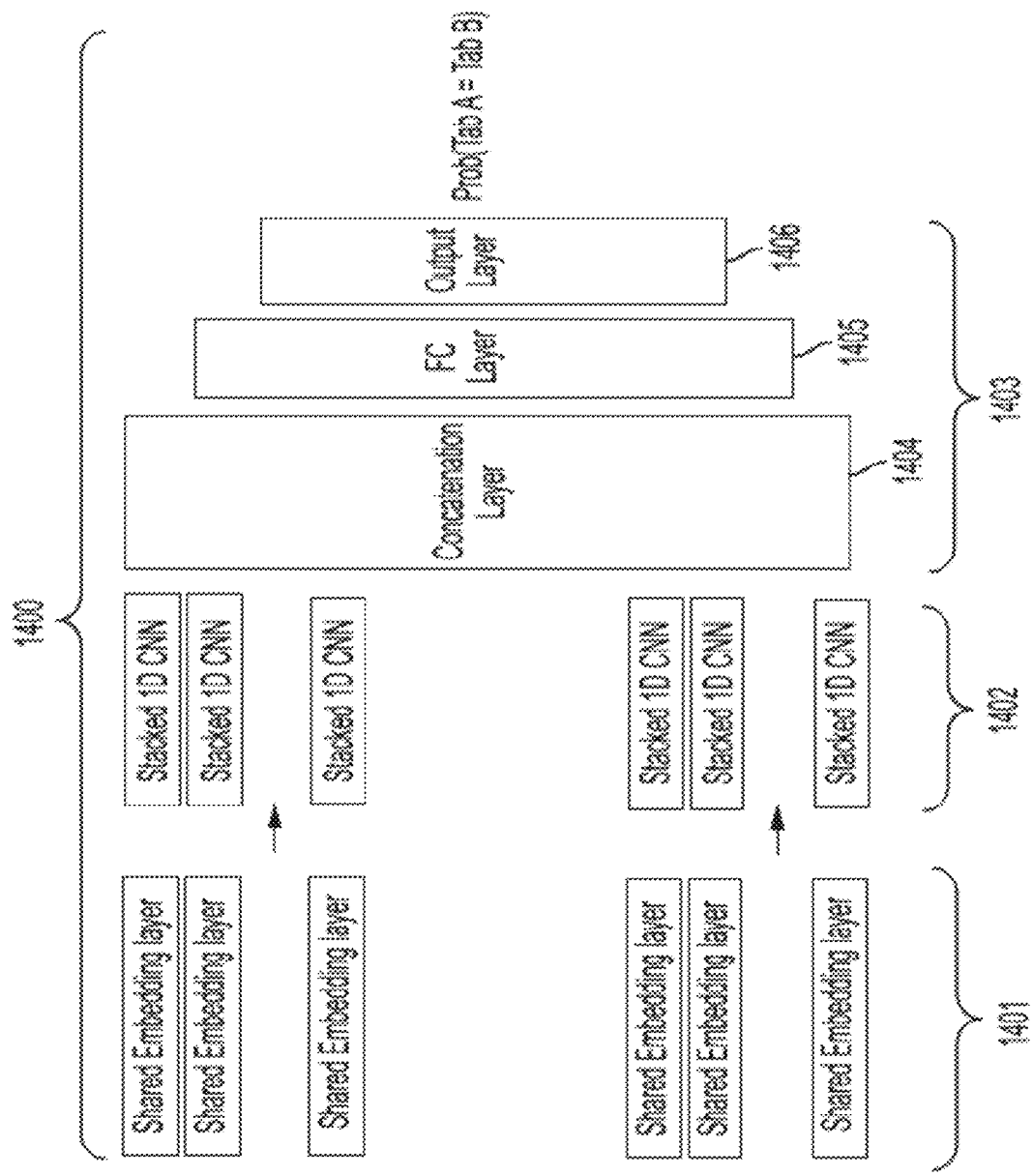

FIGS. 14A and 14B provides an operational example of a cross-table data similarity score generation machine learning model in accordance with some embodiments discussed herein.

Figure 15:
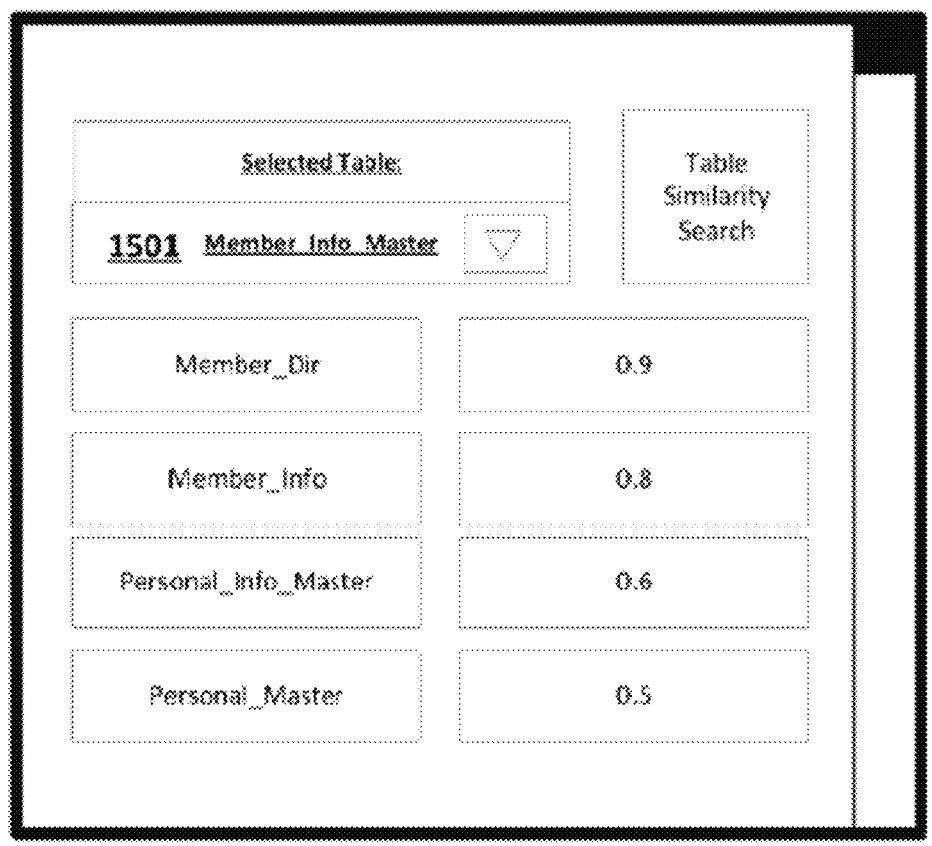

FIG. 15 provides an operational example of a prediction output user interface that describes a ranked list of table data objects that are deemed related to a primary table data object in accordance with some embodiments discussed herein.

Figure 16:
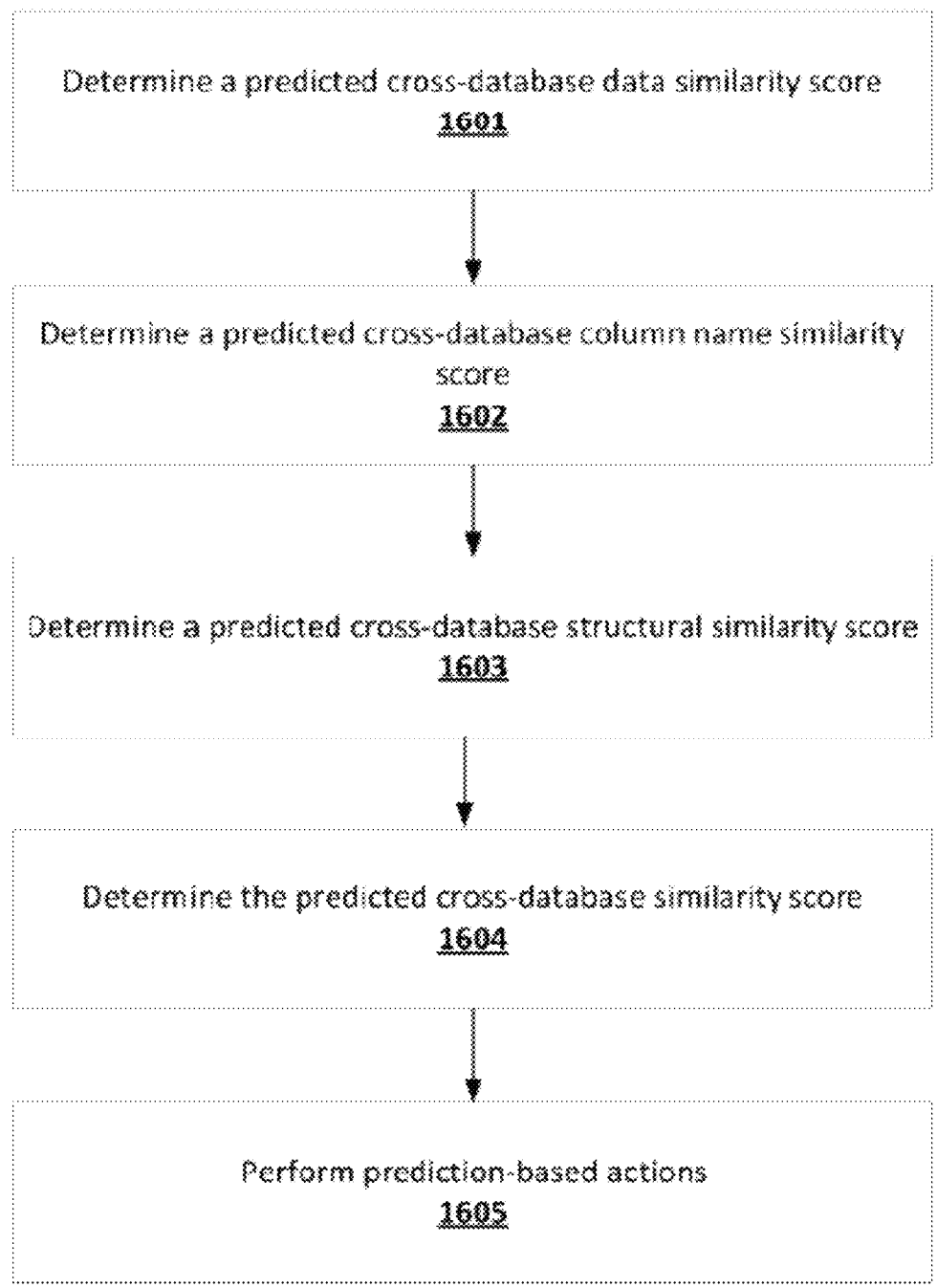

FIG. 16 is a flowchart diagram of an example process for determining a predicted cross-database similarity score for a first database and a second database in accordance with some embodiments discussed herein.

Figure 17:
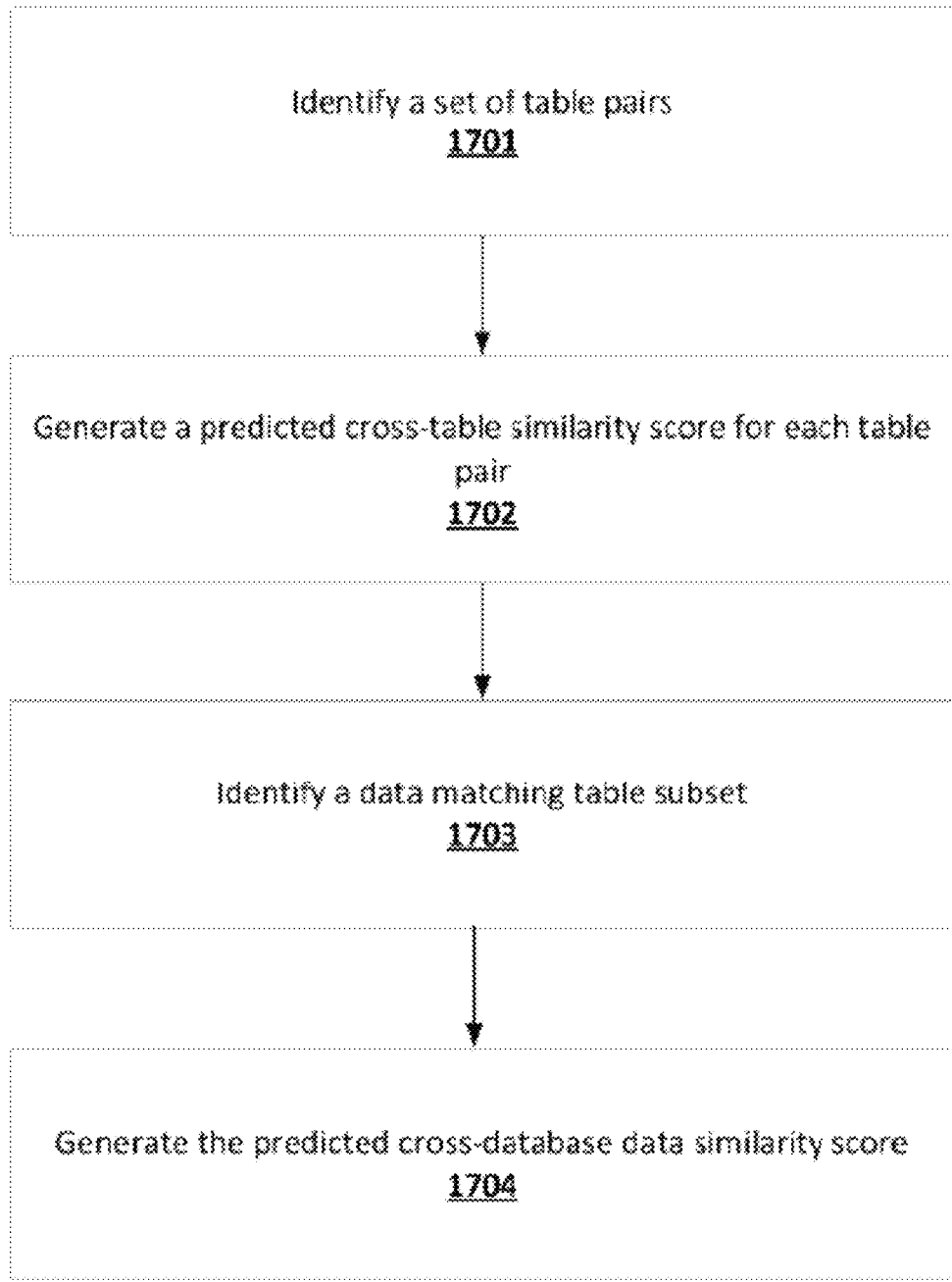

FIG. 17 is a flowchart diagram of an example process for determining a predicted cross-database data similarity score for a first database and a second database in accordance with some embodiments discussed herein.

Figure 18:
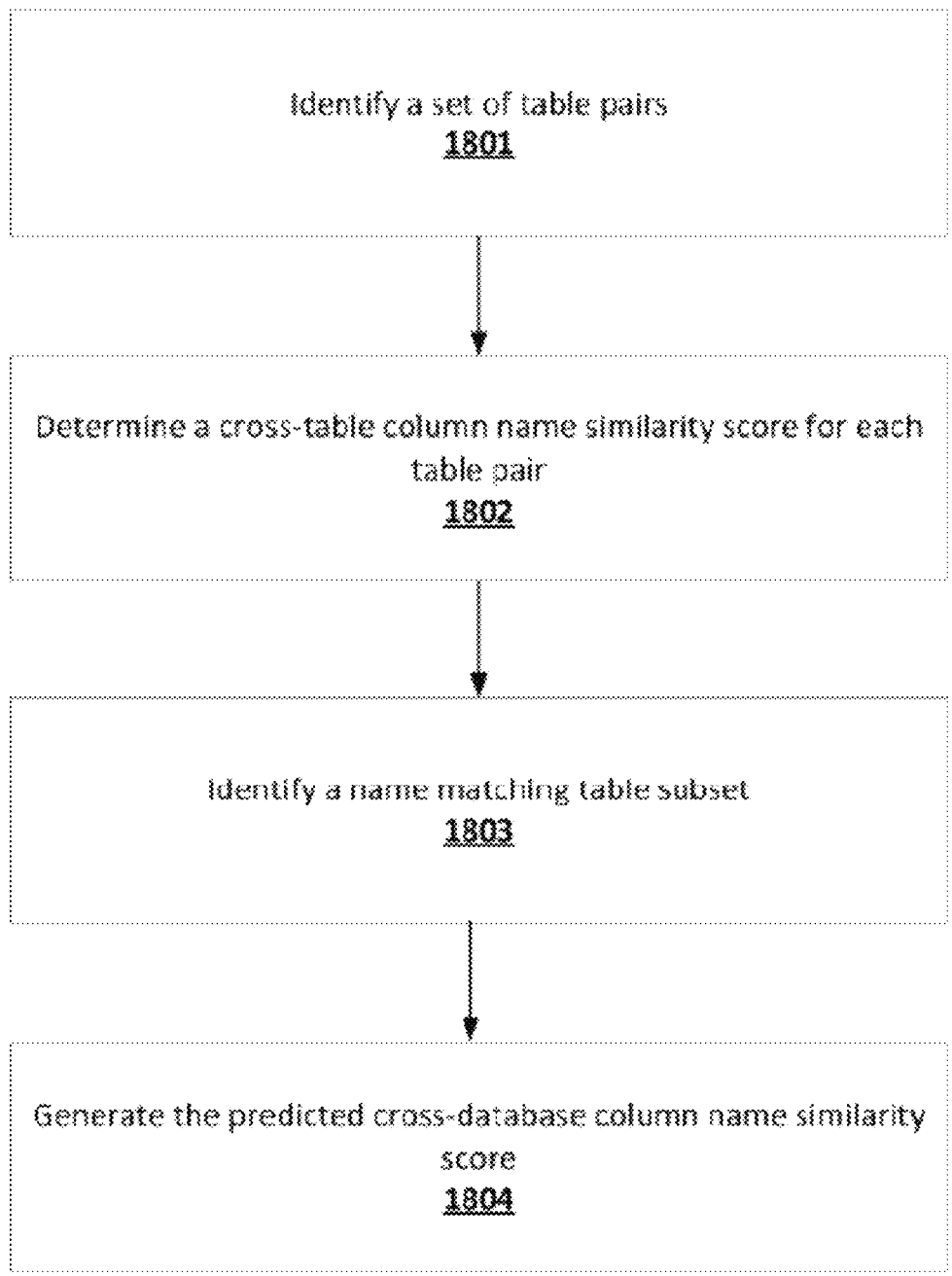

FIG. 18 is a flowchart diagram of an example process for determining a predicted cross-database column name similarity score for a first database and a second database in accordance with some embodiments discussed herein.

FIG. 19 is a flowchart diagram of an example process for generating a cross-table column name similarity score for a table pair in accordance with some embodiments discussed herein.

Figure 20:
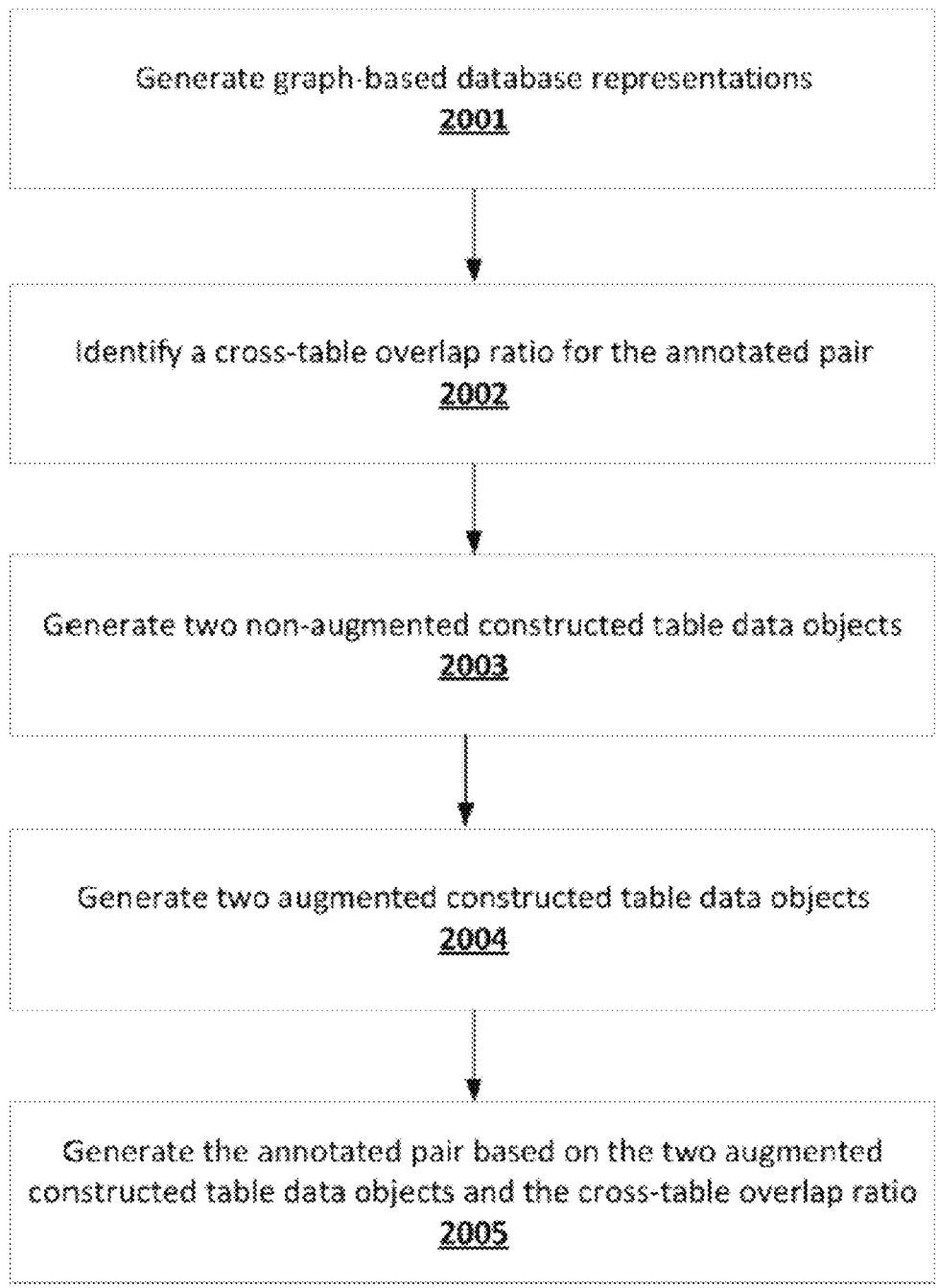

FIG. 20 is a flowchart diagram of an example process for determining a predicted cross-database structural similarity score for a first database and a second database in accordance with some embodiments discussed herein.

Figure 21:
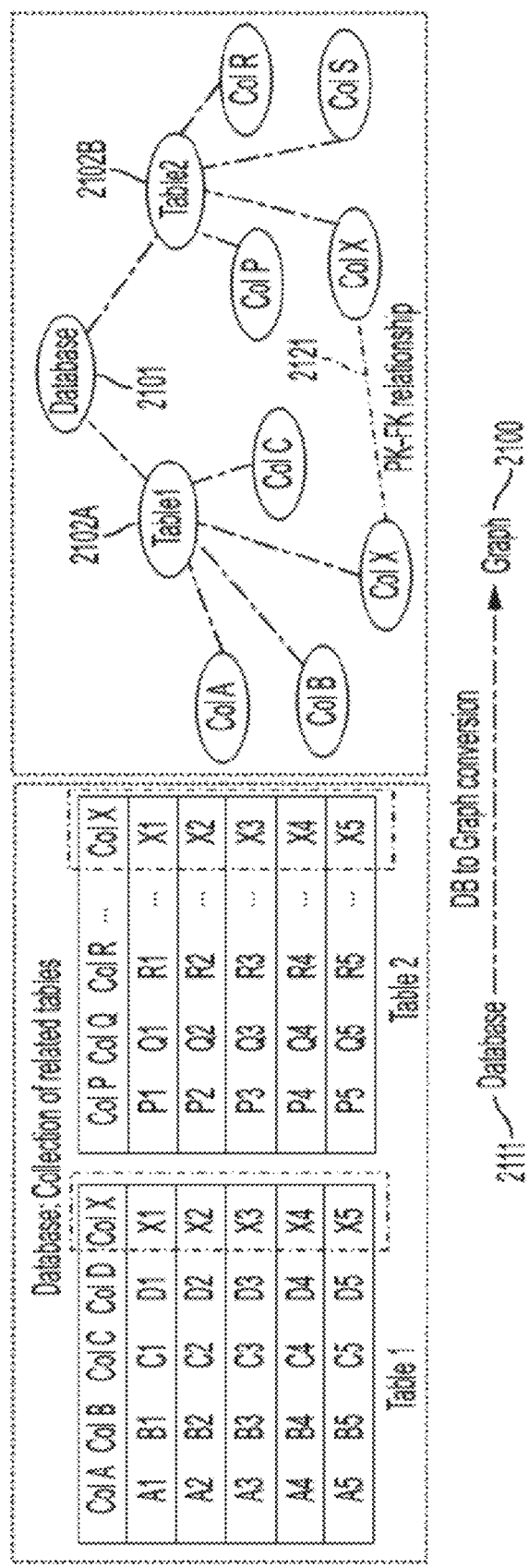

FIG. 21 provides an operational example of a graph-based representation of a database in accordance with some embodiments discussed herein.

Figure 22:
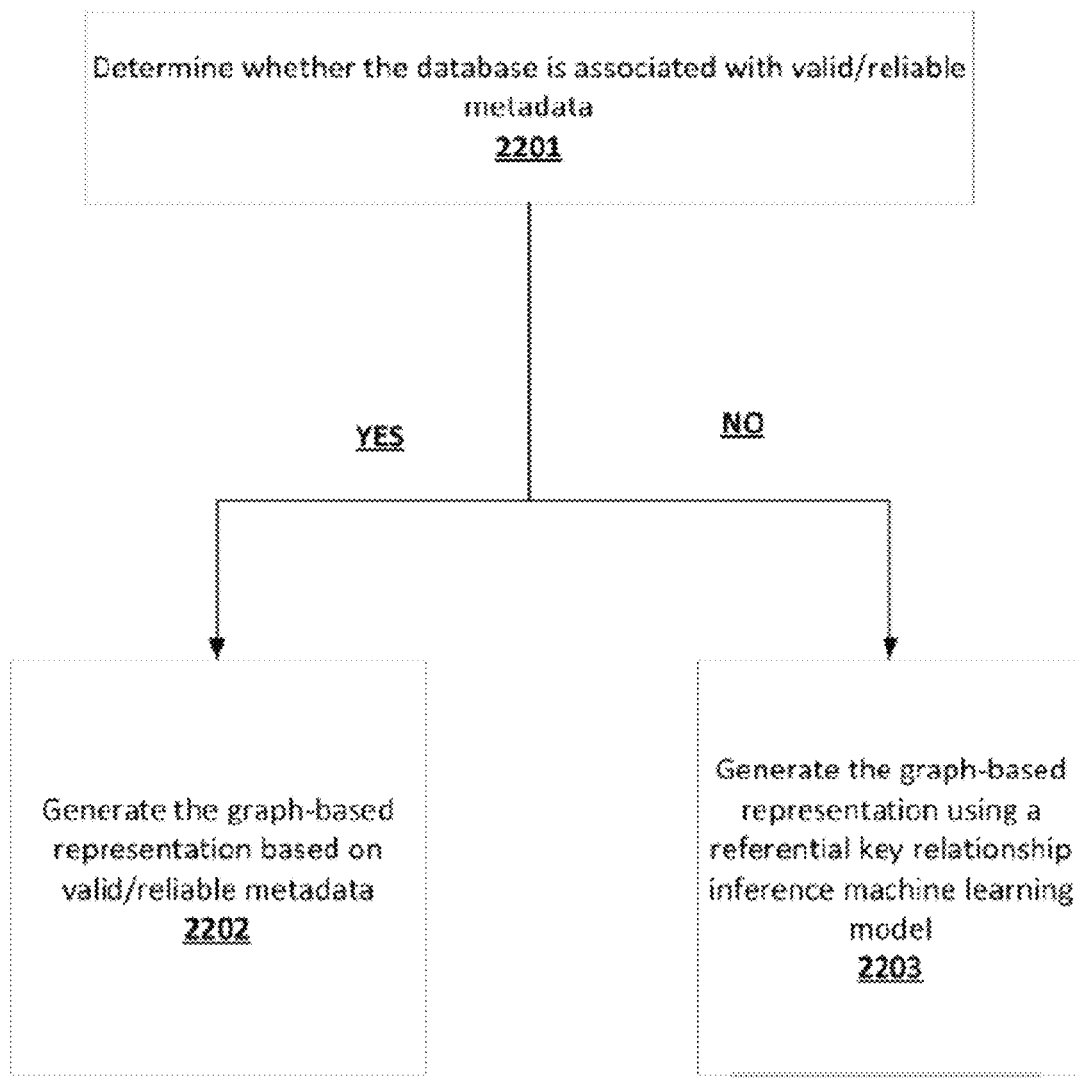

FIG. 22 is a flowchart diagram of an example process for generating a graph-based database representation of database in accordance with some embodiments discussed herein.

Figure 23A:
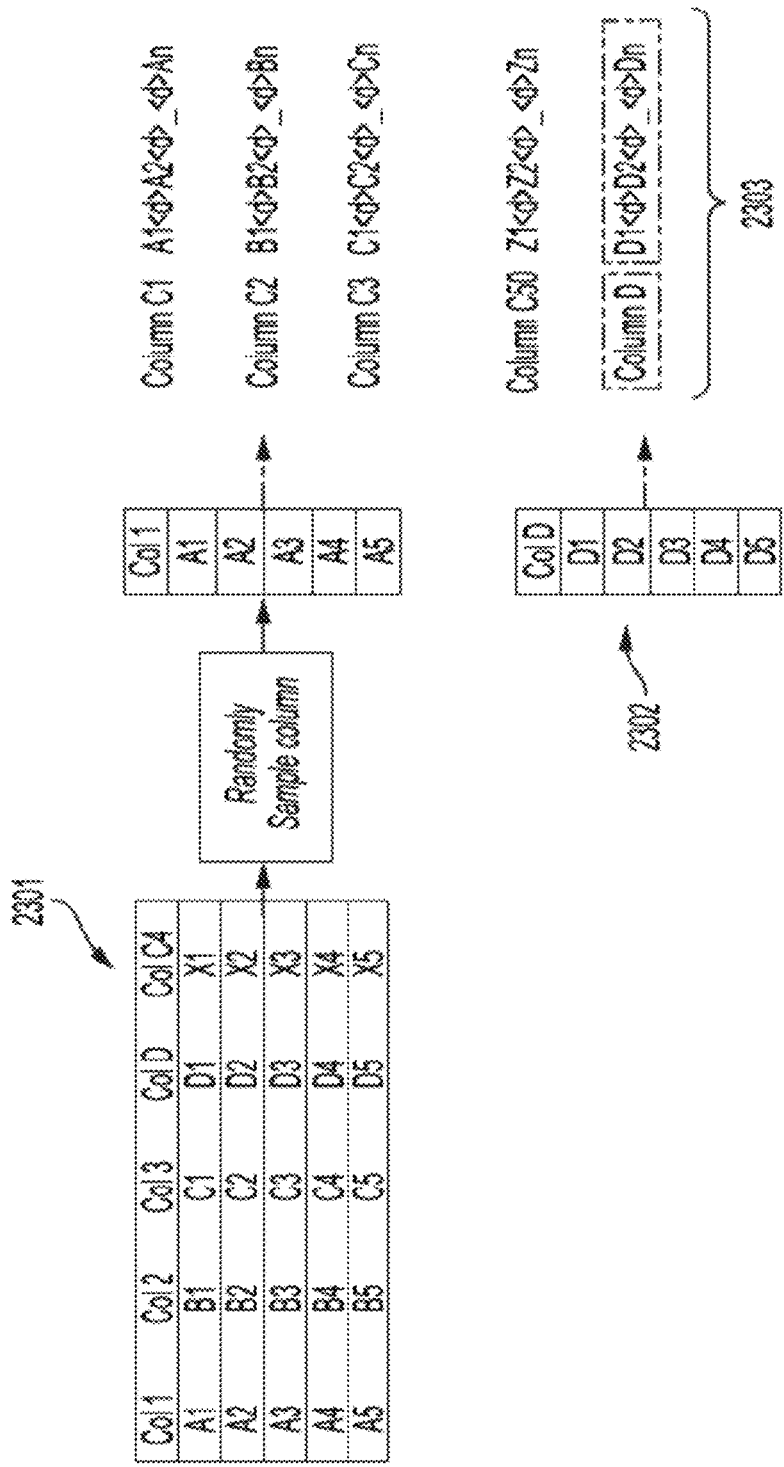
Figure 23B:
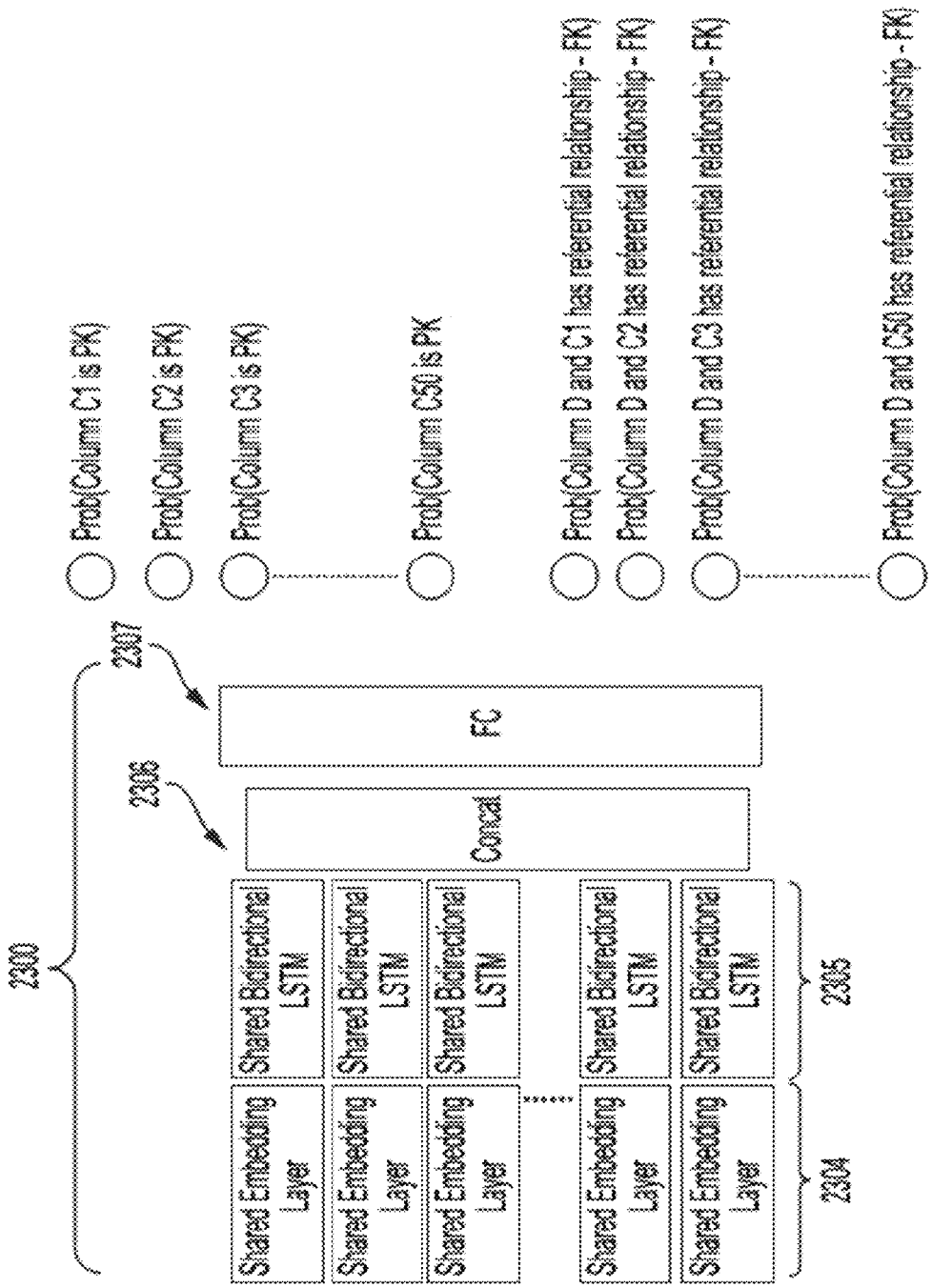

FIGS. 23A and 23B provides an operational example of a referential key relationship inference machine learning model in accordance with some embodiments discussed herein.

Figure 24:
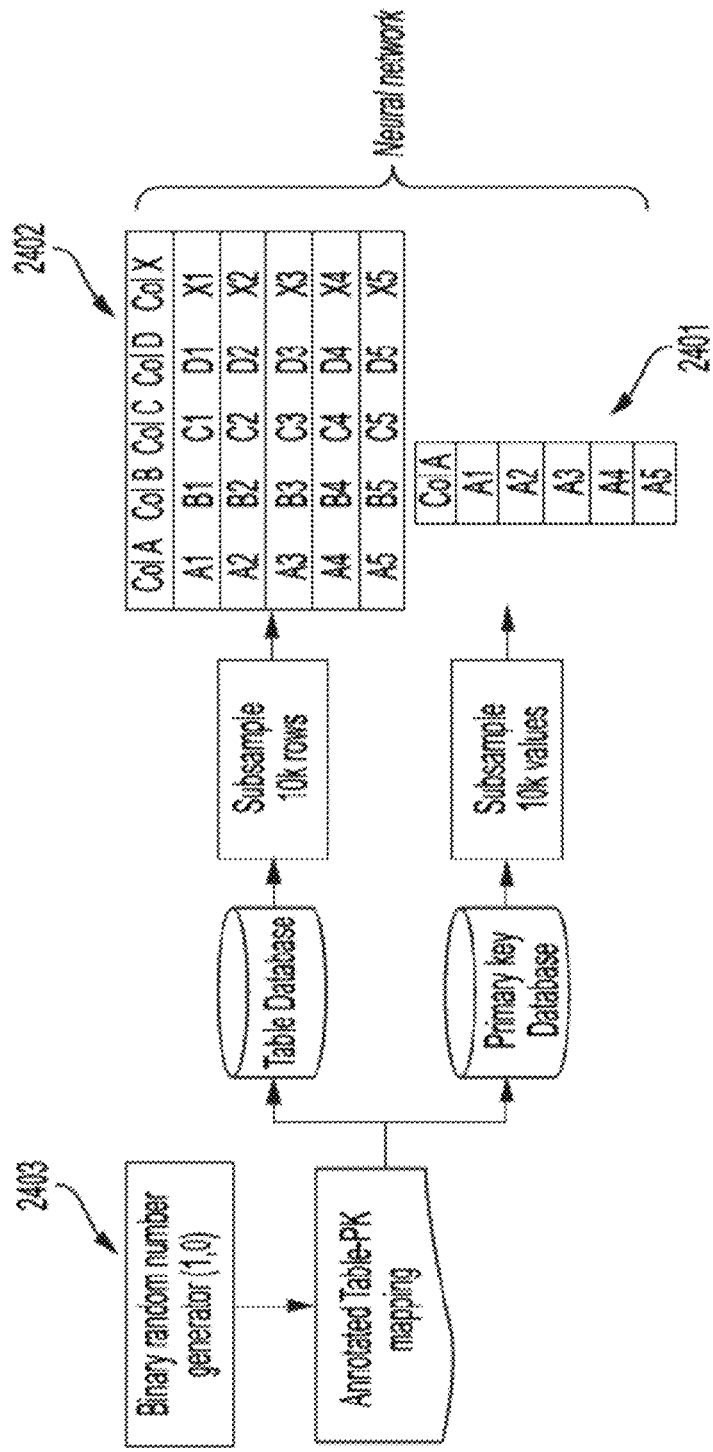

FIG. 24 provides an operational example of generating training data for a referential key relationship inference machine learning model in accordance with some embodiments discussed herein.

Figure 25:
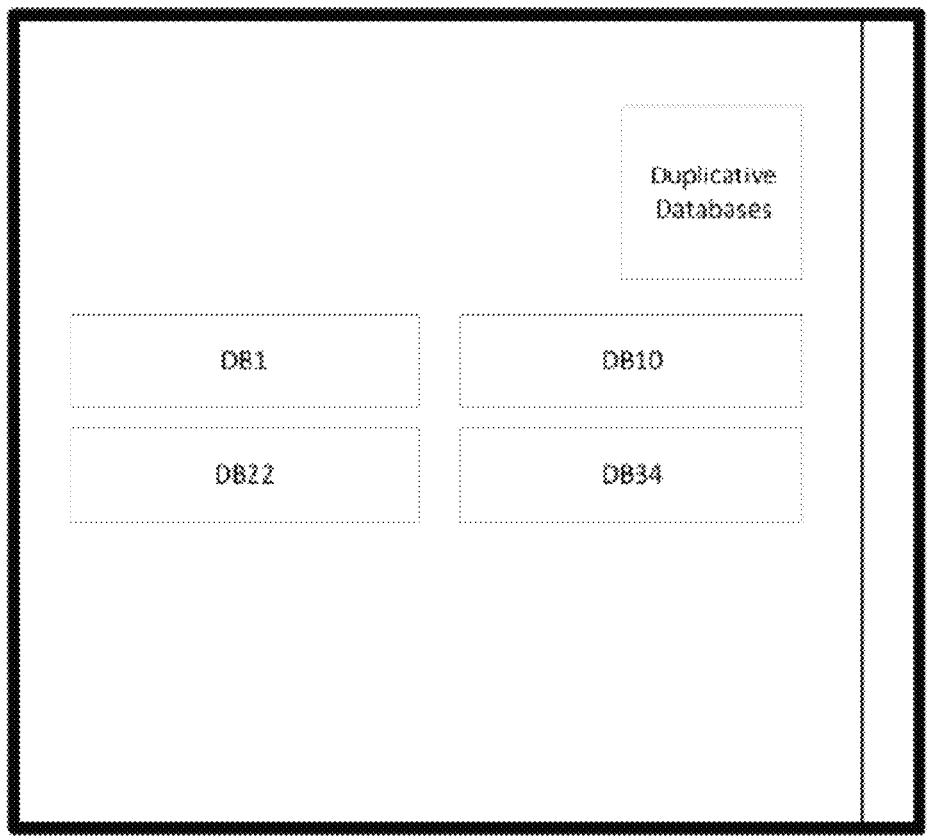

FIG. 25 provides an operational example of a prediction output user interface that displays pairs of databases that are deemed to be duplicative based at least in part on the predicted cross-database similarity scores for the noted pairs in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention provide techniques for determining similarities between table data objects in structured databases. The provided techniques in turn enable end users of structured databases to perform table search operations that enable them to detect similarities across table data objects in a structured database system. This in turn reduces the need for end user operations to detect semantic correlations between table data objects. Therefore, by reducing the need for end user operations to detect semantic correlations between table data objects via providing techniques for determining similarities between table data objects in structured databases in an efficient manner, various embodiments of the present invention reduce operational load on structured database systems by reducing the number of end-user queries to the noted structured database systems.

Various embodiments of the present invention provide techniques for determining erroneous/anomalous table records/rows in a table data object. The provided techniques in turn reduce the size of table data objects stored on structured database systems and reduce the need for performing complex and expensive database processing operations on erroneous/anomalous table records/rows in a table data object. In this way, various embodiments of the present invention reduce both the storage load and the computational load on structured database systems. Thus, by reducing both the storage load and the computational load on structured database systems via providing techniques for determining erroneous/anomalous table records/rows in a table data object, various embodiments of the present invention make important technical contributions to improving efficiency and reliability of structured database systems.

Various embodiments of the present invention provide techniques for determining redundant databases as well as for determining similarities of databases. The provided techniques in turn enable end users of structured database systems to perform database search operations that enable them to detect similarities across database in a structured database system. This in turn reduces the need for end user operations to detect semantic correlations between database systems. Therefore, by reducing the need for end user operations to detect semantic correlations between databases by providing techniques for determining similarities between the noted database systems in structured databases in an efficient manner, various embodiments of the present invention reduce operational load on structured database systems by reducing the number of end-user queries to the noted structured database systems.

Searching for datasets and tables in large data repositories has been a major challenge for long. To address this major challenge, various embodiments of the present invention propose a novel approach to searching for tables in large data repositories. This approach can also be used to compute the similarity between any two complete tables. This search capability is built using only the data contained in the tables and does not use any other metadata. However, additional metadata if available can be used to augment the search functionalities discussed herein. Various embodiments of the present invention calculate the similarity between any given pair of tables. Various embodiments then build an indexed repository for similar tables in decreasing order of accuracy. A supervised deep learning algorithm may be generated using ground-truth cross-table matching scores that are inferred based at least in part on column similarities across pairs of randomly-generated tables.

II. Definitions

The term "row-wise representation" may refer to a data entity that is configured to describe an ordered sequence of a set of characters describing data associated with table cells of a corresponding table row. In some embodiments, to generate a row-wise representation of a table row, a predictive data analysis computing entity first generates an ordered representation of a set of characters that are deemed to occur within the table row, where the set of characters may include a set of explicit characters that may occur as part of the data in the table row as well as a set of inferred characters (e.g., a column separator character that may denote the transition from a table cell of a table row corresponding to a current table column to a table cell of the table row corresponding to a subsequent table column, a missing value character that describes missing values in a table cell of a table row, an unknown character that describes occurrence of characters not defined by the set of explicit characters as part of the data for a table row, and/or the like). Subsequent to generating the ordered representation of the set of characters that are deemed to occur within the table row, the predictive data analysis computing entity may convert the ordered representation of the set of characters to a numerical sequence based at least in part on a character encoding scheme that assigns each character in the set of characters to a numerical value. The row-wise representation may in some embodiments be generated based at least in part on the noted numerical sequence.

The term "embedded row-wise representation" may refer to a data entity that is configured to describe an embedded representation of a row-wise representation for a corresponding table row. In some embodiments, a shared embedding layer of a cross-table data similarity score generation machine learning model is configured to process each row-wise representation for a table row to generate an embedded row-wise representation for the table row. In some embodiments, using a shared embedding layer whose parameters and defined operations are common across all row-wise representation s is important in maintaining the ability of the resulting cross-table data similarity score generation machine learning model to infer similarity relationships between table data objects in a manner that can recognize symmetric relationships between those table data objects.

The term "context-aware row-wise representation" may refer to a data entity that is configured to describe the output of performing a set of convolutional operations on an embedded row-wise representation for a corresponding table row. In some embodiments, a convolutional layer of a cross-table data similarity score generation machine learning model is configured to process each embedded row-wise representation for a table row to generate a context-aware row-wise representation for the table row. In some embodiments, using a convolutional layer whose parameters and defined operations are common across all embedded row-wise representation s is important in maintaining the ability of the resulting cross-table data similarity score generation machine learning model to infer similarity relationships between table data objects in a manner that can recognize symmetric relationships between those table data objects. In some embodiments, performing a convolutional operation as part of the operations of the cross-table data similarity score generation machine learning model is important to learning ordered features of data in the table rows.

The term "predicted cross-table similarity score" may refer to a data entity that is configured to describe an inferred measure of similarity between two table data objects as determined based at least in part on the data values associated with the noted two data objects. In some embodiments, the predicted cross-table similarity score is generated by processing row-wise representations of two table data objects using a cross-table data similarity score generation machine learning model. In some embodiments, a regression layer of a cross-table data similarity score generation machine learning model is configured to process each context-aware row-wise representation for a pair of table data objects to (during training) generate inferred cross-table similarity scores or (during post-training inference) generate cross-table similarity scores. In some embodiments, during training of the cross-table data similarity score generation machine learning model using a pair of constructed table data objects, the regression layer is configured to process each context-aware row-wise representation for a table row of a constructed table data object in a pair of constructed table data objects to generate an inferred cross-table similarity score for the pair of constructed table data objects. In some embodiments, during a post-training inference using the cross-table data similarity score generation machine learning model, the regression layer is configured to process each context-aware row-wise representation for a table row of an input table data object in a pair of constructed table data objects to generate a cross-table similarity score for the pair of input table data objects.

The term "cross-table data similarity score generation machine learning model" may refer to a data entity that is configured to describe parameters, hyper-parameters, and/or defined operations of a machine learning model that is configured to process row-wise representations of a set of table rows associated with a pair of table data objects to generate a predicted cross-table similarity score for the pair of data objects. In some embodiments, the cross-table data similarity score generation machine learning model comprises a shared embedding layer, a differentiated convolutional layer, and a regression layer, where the regression layer may comprise a concatenation layer, a fully-connected layer, and an output layer. Although various embodiments of the present invention describe the noted architecture for a cross-table data similarity score generation machine learning model, a person of ordinary skill in the relevant technology will recognize that other techniques may be used. In some embodiments, inputs to the cross-table data similarity score generation machine learning model include row-wise representations, where each row-wise representation is a vector. In some embodiments, outputs of the cross-table data similarity score generation machine learning model include predicted cross-table similarity scores for pairs of table data objects, where each predicted cross-table similarity score may be atomic values and/or may be presented as part of vectors.

The term "shared embedding layer" may refer to a data entity that is configured to describe parameters, hyper-parameters, and/or defined operations of a machine learning model that is configured to process a variable-size input in order to generate a fixed-size output. In some embodiments, the shared embedding layer is configured to process each row-wise representation for a table row to generate an embedded row-wise representation for the table row. In some embodiments, the shared embedding layer is configured to process each column-wise representation for a table column to generate an embedded column-wise representation for the table column. In some of the noted embodiments, using a shared embedding layer whose parameters and defined operations are common across all column-wise representations is important in maintaining the ability of the resulting cross-table data similarity score generation machine learning model to infer similarity relationships between table data objects in a manner that can recognize symmetric relationships between those table data objects.

The term "convolutional layer" may refer to a data entity that is configured to describe parameters, hyper-parameters, and/or defined operations of a machine learning model that is configured to process an embedded row-wise representation using one or more convolutional operations to generate a context-aware row-wise representation, where each convolutional operation may be associated with at least one batch normalization operation and/or at least one pooling operations. In some embodiments, the convolutional layer is configured to process each embedded row-wise representation for a table row to generate a context-aware row-wise representation for the table row. In some embodiments, using a convolutional layer whose parameters and defined operations are common across all embedded row-wise representation s is important in maintaining the ability of the resulting cross-table data similarity score generation machine learning model to infer similarity relationships between table data objects in a manner that can recognize symmetric relationships between those table data objects. In some embodiments, performing a convolutional operation as part of the operations of the cross-table data similarity score generation machine learning model is important to learning ordered features of data in the table rows.

The term "column-wise representation" may refer to a data entity that is configured to describe an ordered sequence of a set of characters describing data associated with table cells of a corresponding table column. In some embodiments, to generate a column-wise representation of a table column, a predictive data analysis computing entity first generates an ordered representation of a set of characters that are deemed to occur within the table column, where the set of characters may include a set of explicit characters that may occur as part of the data in the table column as well as a set of inferred characters (e.g., a row separator character that may denote the transition from a table cell of a table column corresponding to a current table row to a table cell of the table column corresponding to a subsequent table row, a missing value character that describes missing values in a table cell of a table column, an unknown character that describes occurrence of characters not defined by the set of explicit characters as part of the data for a table column, and/or the like). Subsequent to generating the ordered representation of the set of characters that are deemed to occur within the table column, the predictive data analysis computing entity may convert the ordered representation of the set of characters to a numerical sequence based at least in part on a character encoding scheme that assigns each character in the set of characters to a numerical value. The column-wise representation may in some embodiments be generated based at least in part on the noted numerical sequence.

The term "embedded column-wise representation" may refer to a data entity that is configured to describe an embedded representation of a column-wise representation for a corresponding table column. In some embodiments, a shared embedding layer of a cross-table data similarity score generation machine learning model is configured to process each column-wise representation for a table column to generate an embedded column-wise representation for the table column. In some embodiments, using a shared embedding layer whose parameters and defined operations are common across all column-wise representations is important in maintaining the ability of the resulting cross-table data similarity score generation machine learning model to infer similarity relationships between table data objects in a manner that can recognize symmetric relationships between those table data objects.

The term "referential key relationship inference machine learning model" may refer to a data entity that is configured to describe parameters, hyper-parameters, and/or defined operations of a machine learning model that is configured to process column-wise representations for a potential primary key column of a database and the set of input columns of a table data object of the database to determine, for each input column: (i) a predicted primary key likelihood score describing an inferred likelihood that the input column is a primary key column for the table data object, and (ii) a predicted referential key relationship likelihood score describing an inferred likelihood that a primary-key foreign-key (PK-FK) relationship exists between the potential primary key column and the input column. In some embodiments, in response to determining that a database is associated with valid/reliable metadata, a predictive data analysis computing entity generates the graph-based database representation based at least in part on valid/reliable metadata. However, in response to determining that the database is not associated with valid/reliable metadata, a predictive data analysis computing entity generates the graph-based database representation by generating a an initial graph-based representation of the database using existing metadata of the database and using inferred referential key relationships that are inferred using a referential key relationship inference machine learning model to enrich the initial graph-based representation of the database.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis with respect to structured data objects. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated polygenic risk score predictions. Examples of predictive data analysis requests that may be processed by the predictive data analysis system 101 include request for determining similarity across table data objects, requests for searching top n table data objects for a target table data objects, request for determining anomalous table rows/records within a table data object, and requests for detecting databases that are deemed redundant/duplicate in relation to a target database.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive structured data predictive data analysis requests from one or more external computing entities 102, process the predictive data analysis requests to generate the predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis tasks as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 200 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 190, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 200 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

B. Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

Provided below are exemplary techniques for performing cross-table data similarity score generation and cross-database similarity determination. While various embodiments of the present invention discuss the noted sets of techniques as being performed by a singular computing entity, a person of ordinary skill in the relevant technology will recognize that each set of techniques may be performed by any set of one or more computing entities. Moreover, while various embodiments of the present invention discuss the noted sets of techniques as being performed by a server computing entity in a client-server network architecture, a person of ordinary skill in the relevant technology will recognize that each set of techniques may be performed by a client computing entity in a client-server network architecture and/or may be performed in accordance with a network architecture other than the client-server network architecture, such as a peer-to-peer network architecture.

A. Cross-Table Data Similarity Score Generation Machine Learning Models

FIG. 4 is a flowchart diagram of an example process 400 for generating a predicted cross-table data similarity score for a first table data object and a second table data object. While various embodiments of the present invention describe the training and inference components of the process 400 as being performed by a common computing entity, a person of ordinary skill in the relevant technology will recognize that each of the training and inference components of the process 400 may be performed by one or more computing entities. The process 400 will now be described with reference to the predictive data analysis computing entity 106 as described above in relation to FIG. 1.

The process 400 begins at step/operation 401 when the predictive data analysis computing entity 106 generates annotated pairs of constructed table data objects based at least in part on a set of training databases. In some embodiments, at step/operation 401, the predictive data analysis computing entity 106 identifies (e.g., receives) a set of training databases each associated with a set of training table data objects and processes the set of training databases to generate the annotated pairs of constructed table data objects.

In some embodiments, step/operation 401 may be performed in accordance with the process that is depicted in FIG. 5. The process that is depicted in FIG. 5 begins at step/operation 501 when the predictive data analysis computing entity 106 identifies the set of training table columns associated with the set of training databases. In some embodiments, at step/operation 501, the predictive data analysis computing entity 106 collects all of the table columns associated with all of the set of training table data objects of the set of training data columns into a bag of columns or a collection of columns. In some embodiments, the guiding principle of the step/operation 501 is that a table data object can be thought of as a collection of table columns.

At step/operation 502, the predictive data analysis computing entity 106 generates annotated pairs of constructed table data objects based at least in part on the set of training table columns. In some embodiments, each annotated pair of constructed table data objects is associated with a first constructed table data object that is generated by sampling table columns from the set of training table columns, a second constructed table data object that is generated by sampling table columns from the set of training table columns, and a ground-truth cross-table overlap ratio that describes a ratio of a count of common table columns across the first constructed table data object and the second constructed table data object to a count of all of the table columns across the first constructed table data object and the second constructed table data object.

In some embodiments, step/operation 502 may be performed in accordance with the process that is depicted in FIG. 6, which is an exemplary process for generating an annotated pair of constructed table data objects. The process that is depicted in FIG. 6 begins at step/operation 601 when the predictive data analysis computing entity 106 identifies a table size value for the annotated pair of constructed table data objects. In some embodiments, the table size value describes a desired count of table columns of each of the two generated table columns associated with the annotated pair of constructed table data objects, where the noted desired count may be a randomly-generated desired count and/or a pseudorandomly-generated desired count.

For example, as depicted in FIG. 7, given a table size value of 5, the predictive data analysis computing entity 106 may generate two constructed table data objects each having five table columns; given a table size value of 10, the predictive data analysis computing entity 106 may generate two constructed table data objects each having ten table columns; given a table size value of 15, the predictive data analysis computing entity 106 may generate two constructed table data objects each having fifteen table columns; and given a table size value of 40, the predictive data analysis computing entity 106 may generate two constructed table data objects each having forty table columns.

At step/operation 602, the predictive data analysis computing entity 106 identifies a cross-table overlap ratio for the annotated pair of constructed table data objects. In some embodiments, the cross-table overlap ratio describes a ratio of a common column count of the first constructed table data object and the second constructed table data object and a total column count of the first constructed table data object and the second constructed table data object. In some embodiments, the cross-table column overlap ratio for a first table data object and a second table data object is determined based at least in part on the equation $$\frac{A \cap B}{A \cup B},$$

where A denotes the set of table columns of the first data object and B denotes the set of table columns of the second data object. In some embodiments, the cross-table overlap ratio is a randomly-generated value and/or a pseudo-randomly-generated value.

For example, as depicted in FIG. 8, given a cross-table overlap ration of 0, the predictive data analysis computing entity 106 may generate two constructed table data objects having no overlapping table columns and thus a zero-valued common column count; given a cross-table overlap ratio of 10, the predictive data analysis computing entity 106 may generate two constructed table data objects having ten percent overlapping columns and thus a common column count that is determined based at least in part on ten percent of the table size value; given a cross-table overlap ration of 20, the predictive data analysis computing entity 106 may generate two constructed table data objects having twenty percent overlapping columns and thus a common column count that is determined based at least in part on twenty percent of the table size value; and given a cross-table overlap ration of 100, the predictive data analysis computing entity 106 may generate two constructed table data objects having one hundred percent overlapping columns and thus a common column count that is determined based at least in part on one hundred percent of the table size value, i.e., based at least in part on the table size value itself.

At step/operation 603, the predictive data analysis computing entity 106 generates two non-augmented constructed table data objects for the annotated pair of constructed table data objects based at least in part on the table size value and the cross-table overlap ratio. In some embodiments, to generate each non-augmented constructed table data object for the annotated pair of constructed table data objects, the predictive data analysis computing entity 106 randomly and/or pseudorandomly samples n table columns from the set of training table columns for the non-augmented constructed table data object, where: (i) n is determined based at least in part on the table size value, (ii) the random and/or pseudorandom sampling is performed in a manner that is configured to cause m percent of the n table columns to also be present in the other non-augmented constructed table data object for the annotated pair of constructed table data objects, and (iii) m is determined based at least in part on the cross-table overlap ratio. In some embodiments, to generate the two non-augmented constructed table data objects for the annotated pair of constructed table data objects, the predictive data analysis computing entity 106 first samples (e.g., randomly and/or pseudorandomly) a first set of m table columns from the set of training table columns, then samples (e.g., randomly and/or pseudorandomly) a second set of n−m table columns from the set of training table columns, then samples (e.g., randomly and/or pseudorandomly) a third set of n−m table columns from the set of training table columns, then generates the first non-augmented constructed table data object by combining the first set and the second set, and then generates the second non-augmented constructed table data object by combining the first set and the third set. In some of the noted embodiments, n is determined based at least in part on the table size value, and m is determined based at least in part on the cross-table overlap ratio.

Operational examples of generating pairs of non-augmented constructed table data objects are depicted in FIGS. 9A-9C. For example, as depicted in FIG. 9A, given a table size value of 5 and a cross-table overlap ration of 20, two non-augmented constructed table data objects are generated, where each non-augmented constructed table data object has five table columns, and where twenty percent (e.g., one table column) of the table columns for each non-augmented constructed table data object is shared with the table columns for the other non-augmented constructed table data object. As further depicted in FIG. 9B, given a table size value of 5 and a cross-table overlap ration of 40, two non-augmented constructed table data objects are generated, where each non-augmented constructed table data object has five table columns, and where forty percent (e.g., two table columns) of the table columns for each non-augmented generated table data are is shared with the table columns for the other non-augmented constructed table data object. As further depicted in FIG. 9C, given a table size value of 5 and a cross-table overlap ration of 100, two non-augmented constructed table data objects are generated, where each non-augmented constructed table data object has five table columns, and where one hundred percent (e.g., five table columns) of the table columns for each non-augmented constructed table data object are shared with the table columns for the other non-augmented constructed table data object.

At step/operation 604, the predictive data analysis computing entity 106 performs one or more table row shuffling operations and one or more column shuffling operations across on each non-augmented constructed table data object to generate an augmented constructed table data object. While various embodiments of the present invention describe performing both table row shuffling operations and column shuffling operations on non-augmented constructed table data objects to generate augmented constructed table data objects, a person of ordinary skill in the relevant technology will recognize that in some embodiments only one of n table row shuffling operations and m column shuffling operations may be performed on non-augmented constructed table data objects to generate augmented constructed table data objects (where n and m may be predefined values defined by the configuration data for the predictive data analysis computing entity 106). In some embodiments, data in the non-augmented constructed table data objects are shuffled to randomize the data. This process of randomization of the data greatly may improve the accuracy of prediction results and produce sufficient training data needed to train a cross-table data similarity score generation machine learning model.

For example, as depicted in 10, the non-augmented constructed table data object 1001 is shuffled both table row-wise and column-wise in order to generate augmented constructed table data objects 1002-1003. As further depicted in FIG. 10, column-wise shuffling of a table data object may include switching ordering of table columns associated with the table data object, while table row-wise shuffling of a table data object may include switching ordering of table rows associated with the table data object.

At step/operation 605, the predictive data analysis computing entity 106 generates the annotated pair of constructed table data objects based at least in part on the two augmented constructed table data objects for the annotated pair and the cross-table overlap ratio for the annotated pair. In some embodiments, to generate the annotated pair of constructed table data objects, the predictive data analysis computing entity 106 adopts the two augmented constructed table data objects as the pair of constructed table data objects and adopts the cross-table overlap ratio as the ground-truth cross-table overlap ration for the pair of constructed table data object.

An operational example of a set of annotated pair of constructed table data objects is depicted in FIG. 11. In particular, FIG. 11 depicts a set of annotated pair of constructed table data objects including the following annotated pairs of constructed table data objects: a first annotated pair that is associated with the pair of constructed table data objects comprising the table data object $T_{i1}$ and the table data object $T_{i2}$ as well as a ground-truth cross-table overlap ratio of 10 percent; a second annotated pair that is associated with the pair of constructed table data objects comprising the table data object $T_{i2}$ and the table data object $T_{i4}$ as well as a ground-truth cross-table overlap ratio of 5 percent; a third annotated pair that is associated with the pair of constructed table data objects comprising the table data object $T_{i3}$ and the table data object $T_{i4}$ as well as a ground-truth cross-table overlap ratio of 25 percent; and a last annotated pair that is associated with the pair of constructed table data objects comprising the table data object $T_{in}$ and the table data object $T_{ik}$ as well as a ground-truth cross-table overlap ratio of 100 percent.

Returning to FIG. 4, at step/operation 402, the predictive data analysis computing entity 106 processes each annotated pair of constructed table data objects during a training iteration of a cross-table data similarity score generation machine learning model in order to generate the cross-table data similarity score generation machine learning model. In some embodiments, during each training iteration of the cross-table data similarity score generation machine learning model, the predictive data analysis computing entity 106 processes a corresponding annotated pair of constructed table data objects to generate an inferred cross-table similarity score for the annotated pair of constructed table data objects, and then sets parameters of the cross-table data similarity score generation machine learning model based at least in part on a measure of error between the inferred cross-table similarity score for the annotated pair of constructed table data objects and the ground-truth cross-table overlap ratio for the annotated pair of constructed table data objects.

In some embodiments, a cross-table similarity generation machine learning model is a machine learning model that is configured to process row-wise representations of a set of table rows associated with a pair of table data objects to generate a predicted cross-table similarity score for the pair of data objects. In some embodiments, the cross-table data similarity score generation machine learning model comprises a shared embedding layer, a differentiated convolutional layer, and a regression layer, where the regression layer may comprise a concatenation layer, a fully-connected layer, and an output layer. Although various embodiments of the present invention describe the noted architecture for a cross-table data similarity score generation machine learning model, a person of ordinary skill in the relevant technology will recognize that other techniques may be used. In some embodiments, inputs to the cross-table data similarity score generation machine learning model include row-wise representations, where each row-wise representation is a vector. In some embodiments, outputs of the cross-table data similarity score generation machine learning model include predicted cross-table similarity scores for pairs of table data objects, where each predicted cross-table similarity score may be atomic values and/or may be presented as part of vectors.

In some embodiments, the shared embedding layer of a cross-table similarity generation machine learning model is a machine learning model that is configured to process a variable-size input in order to generate a fixed-size output. In some embodiments, the shared embedding layer is configured to process each row-wise representation for a table row to generate an embedded row-wise representation for the table row. In some embodiments, the shared embedding layer is configured to process each column-wise representation for a table column to generate an embedded column-wise representation for the table column. In some of the noted embodiments, using a shared embedding layer whose parameters and defined operations are common across all column-wise representations is important in maintaining the ability of the resulting cross-table data similarity score generation machine learning model to infer similarity relationships between table data objects in a manner that can recognize symmetric relationships between those table data objects.

In some embodiments, a column-wise representation describes an ordered sequence of a set of characters describing data associated with table cells of a corresponding table column. In some embodiments, to generate a column-wise representation of a table column, the predictive data analysis computing entity 106 first generates an ordered representation of a set of characters that are deemed to occur within the table column, where the set of characters may include a set of explicit characters that may occur as part of the data in the table column as well as a set of inferred characters (e.g., a row separator character that may denote the transition from a table cell of a table column corresponding to a current table row to a table cell of the table column corresponding to a subsequent table row, a missing value character that describes missing values in a table cell of a table column, an unknown character that describes occurrence of characters not defined by the set of explicit characters as part of the data for a table column, and/or the like). Subsequent to generating the ordered representation of the set of characters that are deemed to occur within the table column, the predictive data analysis computing entity 106 may convert the ordered representation of the set of characters to a numerical sequence based at least in part on a character encoding scheme that assigns each character in the set of characters to a numerical value. The column-wise representation may in some embodiments be generated based at least in part on the noted numerical sequence.

In some embodiments, an embedded column-wise representation describes an embedded representation of a column-wise representation for a corresponding table column. In some embodiments, a shared embedding layer of a cross-table data similarity score generation machine learning model is configured to process each column-wise representation for a table column to generate an embedded column-wise representation for the table column. In some embodiments, using a shared embedding layer whose parameters and defined operations are common across all column-wise representations is important in maintaining the ability of the resulting cross-table data similarity score generation machine learning model to infer similarity relationships between table data objects in a manner that can recognize symmetric relationships between those table data objects.

In some embodiments, the convolutional layer of a cross-table similarity generation machine learning model is a machine learning model that is configured to process an embedded row-wise representation to generate a context-aware row-wise representation. In some embodiments, the convolutional layer is configured to process each embedded row-wise representation for a table row to generate a context-aware row-wise representation for the table row. In some embodiments, using a convolutional layer whose parameters and defined operations are common across all embedded row-wise representation s is important in maintaining the ability of the resulting cross-table data similarity score generation machine learning model to infer similarity relationships between table data objects in a manner that can recognize symmetric relationships between those table data objects. In some embodiments, performing a convolutional operation as part of the operations of the cross-table data similarity score generation machine learning model is important to learning ordered features of data in the table rows.

In some embodiments, step/operation 402 may be performed in accordance with the process that is depicted in FIG. 12, which is an example process of training a cross-table data similarity score generation machine learning model based at least in part on an annotated pair of constructed table data objects. The process that is depicted in FIG. 12 begins at step/operation 1201 when the predictive data analysis computing entity 106 performs table row shuffling and column shuffling on each constructed table data object in the annotated pair. While various embodiments of the present invention describe performing both table row shuffling operations and column shuffling operations on non-augmented constructed table data objects to generate augmented constructed table data objects, a person of ordinary skill in the relevant technology will recognize that in some embodiments only one of n table row shuffling operations and m column shuffling operations may be performed on non-augmented constructed table data objects to generate augmented constructed table data objects (where n and m may be predefined values defined by the configuration data for the predictive data analysis computing entity 106). In some embodiments, performing shuffling during training makes the resulting cross-table data similarity score generation machine learning model generalize and learn the overall features and not memorize the data. In some embodiments, the shuffling process mimics the real time scenarios where the data columns and values can be in any shape and ordering and thus helps improve accuracy in the final results.

At step/operation 1202, the predictive data analysis computing entity 106 generates a row-wise representation for each table row of a constructed table data object in the annotated pair. In some embodiments, given n table rows of a first constructed table data object in the annotated pair and m table rows of a second constructed table data object in the annotated pair, the predictive data analysis computing entity 106 generates n+m row-wise representation s, where each row-wise representation of the n+m row-wise representation s corresponds to a table row of one of the constructed table data objects in the annotated pair.

In some embodiments, to generate a row-wise representation of a table row, the predictive data analysis computing entity 106 first generates an ordered representation of a set of characters that are deemed to occur within the table row, where the set of characters may include a set of explicit characters that may occur as part of the data in the table row as well as a set of inferred characters (e.g., a column separator character that may denote the transition from a table cell of a table row corresponding to a current table column to a table cell of the table row corresponding to a subsequent table column, a missing value character that describes missing values in a table cell of a table row, an unknown character that describes occurrence of characters not defined by the set of explicit characters as part of the data for a table row, and/or the like). Subsequent to generating the ordered representation of the set of characters that are deemed to occur within the table row, the predictive data analysis computing entity 106 may convert the ordered representation of the set of characters to a numerical sequence based at least in part on a character encoding scheme that assigns each character in the set of characters to a numerical value. The row-wise representation may in some embodiments be generated based at least in part on the noted numerical sequence.

An operational example of generating a row-wise representation 1302 for a table row 1301 based at least in part on the character encoding scheme 1303 is depicted in FIG. 13. As depicted in FIG. 13, the character encoding scheme 1303 assigns each character in the depicted set of characters to a numerical value defined by the order of the character within the depicted set of characters, such that for example the character "a" is associated with the number 01, the character "b" is associated with the number 02, and so on. As further depicted in FIG. 13, the depicted set of characters includes a space character 1311, a column separator character 1312, a missing value character 1313, and an unknown character 1314. To generate the row-wise representation 1302 for the table row 1301, the predictive data analysis computing entity 106 generates the ordered representation 1304 of the set of characters as they occur within the table row 1301, and then converts the ordered representation 1304 to the row-wise representation 1302 based at least in part on the character encoding scheme 1303. Accordingly, as depicted in FIG. 13, because the first character in the ordered representation 1304 is "a," the first number in the row-wise representation 1302 is 01; because the second character in the ordered representation 1304 is "b," the second number in the row-wise representation 1302 is 02; because the third character in the ordered representation 1304 is "c," the third number in the row-wise representation 1302 is 03; because the fourth character in the ordered representation 1304 is the column separator character, the fourth number in the row-wise representation 1302 is 99; and so on.

In some embodiments, a row-wise representation describes an ordered sequence of a set of characters describing data associated with table cells of a corresponding table row. In some embodiments, to generate a row-wise representation of a table row, a predictive data analysis computing entity first generates an ordered representation of a set of characters that are deemed to occur within the table row, where the set of characters may include a set of explicit characters that may occur as part of the data in the table row as well as a set of inferred characters (e.g., a column separator character that may denote the transition from a table cell of a table row corresponding to a current table column to a table cell of the table row corresponding to a subsequent table column, a missing value character that describes missing values in a table cell of a table row, an unknown character that describes occurrence of characters not defined by the set of explicit characters as part of the data for a table row, and/or the like). Subsequent to generating the ordered representation of the set of characters that are deemed to occur within the table row, the predictive data analysis computing entity may convert the ordered representation of the set of characters to a numerical sequence based at least in part on a character encoding scheme that assigns each character in the set of characters to a numerical value. The row-wise representation may in some embodiments be generated based at least in part on the noted numerical sequence.

At step/operation 1203, the predictive data analysis computing entity 106 processes each row-wise representation using the cross-table data similarity score generation machine learning model to generate an inferred cross-table similarity score for the annotated pair of constructed table data objects. The precise nature of the computer-implemented operations that are performed as part of the step/operation 1203 depends on the architecture of the cross-table data similarity score generation machine learning model. In some embodiments, the cross-table data similarity score generation machine learning model comprises a shared embedding layer, a differentiated convolutional layer, and a regression layer, where the regression layer may comprise a concatenation layer, a fully-connected layer, and an output layer.

In some embodiments, the shared embedding layer is configured to process each row-wise representation for a table row to generate an embedded row-wise representation for the table row. In some embodiments, using a shared embedding layer whose parameters and defined operations are common across all row-wise representation s is important in maintaining the ability of the resulting cross-table data similarity score generation machine learning model to infer similarity relationships between table data objects in a manner that can recognize symmetric relationships between those table data objects.

In some embodiments, an embedded row-wise representation describes an embedded representation of a row-wise representation for a corresponding table row. In some embodiments, a shared embedding layer of a cross-table data similarity score generation machine learning model is configured to process each row-wise representation for a table row to generate an embedded row-wise representation for the table row. In some embodiments, using a shared embedding layer whose parameters and defined operations are common across all row-wise representation s is important in maintaining the ability of the resulting cross-table data similarity score generation machine learning model to infer similarity relationships between table data objects in a manner that can recognize symmetric relationships between the noted table data objects.

In some embodiments, the convolutional layer is configured to process each embedded row-wise representation for a table row to generate a context-aware row-wise representation for the table row. In some embodiments, using a convolutional layer whose parameters and defined operations are common across all embedded row-wise representation s is important in maintaining the ability of the resulting cross-table data similarity score generation machine learning model to infer similarity relationships between table data objects in a manner that can recognize symmetric relationships between those table data objects. In some embodiments, performing a convolutional operation as part of the operations of the cross-table data similarity score generation machine learning model is important to learning ordered features of data in the table rows.

In some embodiments, the context-aware row-wise representation is the output of performing a set of convolutional operations on an embedded row-wise representation for a corresponding table row. In some embodiments, a convolutional layer of a cross-table data similarity score generation machine learning model is configured to process each embedded row-wise representation for a table row to generate a context-aware row-wise representation for the table row. In some embodiments, using a convolutional layer whose parameters and defined operations are common across all embedded row-wise representation s is important in maintaining the ability of the resulting cross-table data similarity score generation machine learning model to infer similarity relationships between table data objects in a manner that can recognize symmetric relationships between those table data objects. In some embodiments, performing a convolutional operation as part of the operations of the cross-table data similarity score generation machine learning model is important to learning ordered features of data in the table rows.

In some embodiments, the regression layer is configured to process each context-aware row-wise representation for a pair of table data objects to (during training) generate inferred cross-table similarity scores or (during post-training inference) generate cross-table similarity scores. In some embodiments, during training of the cross-table data similarity score generation machine learning model using a pair of constructed table data objects, the regression layer is configured to process each context-aware row-wise representation for a table row of a constructed table data object in a pair of constructed table data objects to generate an inferred cross-table similarity score for the pair of constructed table data objects. In some embodiments, during a post-training inference using the cross-table data similarity score generation machine learning model, the regression layer is configured to process each context-aware row-wise representation for a table row of an input table data object in a pair of constructed table data objects to generate a cross-table similarity score for the pair of input table data objects. In some embodiments, the regression layer comprises: (i) a concatenation layer that is configured to aggregate/concatenate context-aware table row representations for a particular table data object in a pair of table data objects in order to generate a table-wise representation of the particular table data object, (ii) a fully-connected layer that is configured to generate an inferred fully-connected output based at least in part on each table-wise representation for a table data object in the pair of table data objects, and (iii) an output layer that is configured to generate the predicted cross-table data similarity score based at least in part on the inferred fully-connected output.

An operational example of a cross-table data similarity score generation machine learning model 1400 is depicted in FIG. 14. As depicted in FIGS. 14A and 14B, the cross-table data similarity score generation machine learning model 1400 includes: (i) the shared embedding layer 1401, (ii) the convolutional layer 1402, and (iii) the regression layer 1403 including the concatenation layer 1404, the fully-connected layer 1405, and the output layer 1406.

At step/operation 1204, the predictive data analysis computing entity 106 sets parameters of the cross-table data similarity score generation machine learning model based at least in part on a measure of error between the inferred cross-table similarity score for the annotated pair of constructed table data objects and the ground-truth cross-table overlap ratio for the annotated pair of constructed table data objects. In some embodiments, the predictive data analysis computing entity 106 computes a measure of deviation between inferred cross-table similarity scores and ground-truth cross-table overlap ratios for a batch of pairs of constructed table data objects (where a batch may include one pair of constructed table data objects in accordance with a stochastic gradient descent algorithm and multiple pairs of constructed table data objects in accordance with a batch gradient descent algorithm). In some embodiments, the predictive data analysis computing entity 106 sets the parameters of the cross-table data similarity score generation machine learning model to minimize the measure of deviation. Although various embodiments of the present invention describe training the cross-table data similarity score generation machine learning model by minimizing an error measure, a person of ordinary skill in the relevant technology will recognize that the cross-table data similarity score generation machine learning model may be trained by maximizing a utility measure instead of minimizing an error measure. Moreover, a person of ordinary skill in the relevant technology will recognize that any optimizations described herein may be performed using a global optimization method and/or a local optimization method, such as using a gradient-descent-based optimization technique.

Returning to FIG. 4, at step/operation 403, the predictive data analysis computing entity 106 determines a predicted cross-table data similarity score for a first table data object and a second table data object using the cross-table data similarity score generation machine learning model. In some embodiments, the predictive data analysis computing entity 106 processes each row-wise representation for each table row of a plurality of table rows comprising one or more first table rows of the first table data object and one or more second table rows of the second table data object using the cross-table data similarity score generation machine learning model to generate the predicted cross-table data similarity score for the first table data object and the second table data object.

In some embodiments, the predicted cross-table similarity score is an inferred measure of similarity between two table data objects as determined based at least in part on the data values associated with the noted two data objects. In some embodiments, the predicted cross-table similarity score is generated by processing row-wise representations of two table data objects using a cross-table data similarity score generation machine learning model. In some embodiments, a regression layer of a cross-table data similarity score generation machine learning model is configured to process each context-aware row-wise representation for a pair of table data objects to (during training) generate inferred cross-table similarity scores or (during post-training inference) generate cross-table similarity scores. In some embodiments, during training of the cross-table data similarity score generation machine learning model using a pair of constructed table data objects, the regression layer is configured to process each context-aware row-wise representation for a table row of a constructed table data object in a pair of constructed table data objects to generate an inferred cross-table similarity score for the pair of constructed table data objects. In some embodiments, during a post-training inference using the cross-table data similarity score generation machine learning model, the regression layer is configured to process each context-aware row-wise representation for a table row of an input table data object in a pair of constructed table data objects to generate a cross-table similarity score for the pair of input table data objects.

In some embodiments, to perform the step/operation 403, the predictive data analysis computing entity 106 first generates a row-wise representation for each table row of a plurality of table rows comprising one or more first table rows of the first table data object and one or more second table rows of the second table data object. In some embodiments, to generate a row-wise representation of a table row, the predictive data analysis computing entity 106 first generates an ordered representation of a set of characters that are deemed to occur within the table row, where the set of characters may include a set of explicit characters that may occur as part of the data in the table row as well as a set of inferred characters (e.g., a column separator character that may denote the transition from a table cell of a table row corresponding to a current table column to a table cell of the table row corresponding to a subsequent table column, a missing value character that describes missing values in a table cell of a table row, an unknown character that describes occurrence of characters not defined by the set of explicit characters as part of the data for a table row, and/or the like). Subsequent to generating the ordered representation of the set of characters that are deemed to occur within the table row, the predictive data analysis computing entity 106 may convert the ordered representation of the set of characters to a numerical sequence based at least in part on a character encoding scheme that assigns each character in the set of characters to a numerical value. The row-wise representation may in some embodiments be generated based at least in part on the noted numerical sequence.

In some embodiments, to perform the step/operation 403, the predictive data analysis computing entity 106 processes each row-wise representation for the first table data object and the second table data object using the cross-table data similarity score generation machine learning model to generate the predicted cross-table similarity score. The precise nature of the computer-implemented operations that are performed as part of the step/operation 403 may thus depend on the architecture of the cross-table data similarity score generation machine learning model. In some embodiments, the cross-table data similarity score generation machine learning model comprises a shared embedding layer, a differentiated convolutional layer, and a regression layer, where the regression layer may comprise a concatenation layer, a fully-connected layer, and an output layer.

In some embodiments, the shared embedding layer is configured to process each row-wise representation for a table row to generate an embedded row-wise representation for the table row. In some embodiments, using a shared embedding layer whose parameters and defined operations are common across all row-wise representation s is important in maintaining the ability of the resulting cross-table data similarity score generation machine learning model to infer similarity relationships between table data objects in a manner that can recognize symmetric relationships between those table data objects.

In some embodiments, the convolutional layer is configured to process each embedded row-wise representation for a table row to generate a context-aware row-wise representation for the table row. In some embodiments, using a convolutional layer whose parameters and defined operations are common across all embedded row-wise representation s is important in maintaining the ability of the resulting cross-table data similarity score generation machine learning model to infer similarity relationships between table data objects in a manner that can recognize symmetric relationships between those table data objects. In some embodiments, performing a convolutional operation as part of the operations of the cross-table data similarity score generation machine learning model is important to learning ordered features of data in the table rows.

In some embodiments, the regression layer is configured to process each context-aware row-wise representation for a pair of table data objects to (during training) generate inferred cross-table similarity scores or (during post-training inference) generate cross-table similarity scores. In some embodiments, during training of the cross-table data similarity score generation machine learning model using a pair of constructed table data objects, the regression layer is configured to process each context-aware row-wise representation for a table row of a constructed table data object in a pair of constructed table data objects to generate an inferred cross-table similarity score for the pair of constructed table data objects. In some embodiments, during a post-training inference using the cross-table data similarity score generation machine learning model, the regression layer is configured to process each context-aware row-wise representation for a table row of an input table data object in a pair of constructed table data objects to generate a cross-table similarity score for the pair of input table data objects. In some embodiments, the regression layer comprises: (i) a concatenation layer that is configured to aggregate/concatenate context-aware table row representations for a particular table data object in a pair of table data objects in order to generate a table-wise representation of the particular table data object, (ii) a fully-connected layer that is configured to generate an inferred fully-connected output based at least in part on each table-wise representation for a table data object in the pair of table data objects, and (iii) an output layer that is configured to generate the predicted cross-table data similarity score based at least in part on the inferred fully-connected output.

At step/operation 404, the predictive data analysis computing entity 106 performs one or more prediction-based actions based at least in part on the predicted cross-table similarity score. Examples of prediction-based actions include automatically merging two or more table data objects that are deemed sufficiently similar (e.g., whose predicted cross-table similarity score satisfies a predicted cross-table similarity threshold) to generate a merged table data object and automatically replacing the two or more table data objects in a database within the merged table data objects.

In some embodiments, performing the prediction-based actions includes causing display of a prediction output user interface that describes a ranked list of table data objects that are deemed related to a primary table data object. An operational example of such a prediction output user interface 1500 is depicted in FIG. 15. As depicted in FIG. 15, the prediction output user interface 1500 describes a ranked list of table data objects for the primary table data object 1501, where the ranking is performed based at least in part on predicted cross-table similarity scores for a set of table data objects in relation to the primary table data object 1501, and where the ranked list describes the predicted cross-table similarity score for each table data object that is included in the ranked list.

By utilizing the above-described techniques, various embodiments of the present invention provide techniques for determining similarities between table data objects in structured databases. The provided techniques in turn enable end users of structured databases to perform table search operations that enable them to detect similarities across table data objects in a structured database system. This in turn reduces the need for end user operations to detect semantic correlations between table data objects. Therefore, by reducing the need for end user operations to detect semantic correlations between table data objects via providing techniques for determining similarities between table data objects in structured databases in an efficient manner, various embodiments of the present invention reduce operational load on structured database systems by reducing the number of the received end-user queries for the noted structured database systems.

B. Machine Learning Frameworks for Cross-Database Similarity Determination

FIG. 16 is a flowchart diagram of an example process 1600 for determining a predicted cross-database similarity score for a first database and a second database. While various embodiments of the present invention describe the training and inference components of the process 1600 as being performed by a common computing entity, a person of ordinary skill in the relevant technology will recognize that each of the training and inference components of the process 1600 may be performed by one or more computing entities. The process 1600 will now be described with reference to the predictive data analysis computing entity 106 as described above in relation to FIG. 1.

The process 1600 begins at step/operation 1601 when the predictive data analysis computing entity 106 generates a predicted cross-database data similarity score for the first database and the second database. In some embodiments, the predicted cross-database data similarity score describes a ratio of a count of table data objects in the first table data object and the second table data object that are deemed to have a threshold-satisfying predicted cross-table similarity score to a count of all table data objects in the first table data object and the second table data object. In some embodiments, the predicted cross-table data similarity score is determined based at least in part on the equation $$\frac{|A \cap B|}{|A \cup B| - |A \cap B|},$$

where A denotes the set of table data objects of the first database, B denotes the set of table data objects of the second database, and a pair of table data objects are deemed to be in A∩B if the predicted cross-table similarity score for the pair satisfies a predicted cross-table similarity score threshold (e.g., exceeds a predicted cross-table similarity score threshold).

In some embodiments, step/operation 1601 may be performed in accordance with the process that is depicted in FIG. 17. The process that is depicted in FIG. 17 begins at step/operation 1701 when the predictive data analysis computing entity 106 identifies a set of table pairs, where each table pair is associated with a first table data object from the first database and a second table data object from the second database. In some embodiments, given m table data objects in the first database and n table data objects in the second database, the predictive data analysis computing entity 106 generates m*n table pairs.

At step/operation 1702, the predictive data analysis computing entity 106 processes each table pair using a cross-table data similarity score generation machine learning model to generate a predicted cross-table similarity score for the table pair. In some embodiments, to generate predicted cross-table similarity score for a table pair comprising a first table data object and a second table data object, the predictive data analysis computing entity 106 first generates a row-wise representation for each table row of a plurality of table rows comprising one or more first table rows of the first table data object and one or more second table rows of the second table data object. In some embodiments, to generate a row-wise representation of a table row, the predictive data analysis computing entity 106 first generates an ordered representation of a set of characters that are deemed to occur within the table row, where the set of characters may include a set of explicit characters that may occur as part of the data in the table row as well as a set of inferred characters (e.g., a column separator character that may denote the transition from a table cell of a table row corresponding to a current table column to a table cell of the table row corresponding to a subsequent table column, a missing value character that describes missing values in a table cell of a table row, an unknown character that describes occurrence of characters not defined by the set of explicit characters as part of the data for a table row, and/or the like). Subsequent to generating the ordered representation of the set of characters that are deemed to occur within the table row, the predictive data analysis computing entity 106 may convert the ordered representation of the set of characters to a numerical sequence based at least in part on a character encoding scheme that assigns each character in the set of characters to a numerical value. The row-wise representation may in some embodiments be generated based at least in part on the noted numerical sequence.

In some embodiments, to generate predicted cross-table similarity score for a table pair comprising a first table data object and a second table data object, the predictive data analysis computing entity 106 processes each row-wise representation for the first table data object and the second table data object using the cross-table data similarity score generation machine learning model to generate the predicted cross-table similarity score. The precise nature of the computer-implemented operations that are performed as part of the steps/operation 403 may thus depend on the architecture of the cross-table data similarity score generation machine learning model. In some embodiments, the cross-table data similarity score generation machine learning model comprises a shared embedding layer, a differentiated convolutional layer, and a regression layer, where the regression layer may comprise a concatenation layer, a fully-connected layer, and an output layer.

In some embodiments, the shared embedding layer is configured to process each row-wise representation for a table row to generate an embedded row-wise representation for the table row. In some embodiments, using a shared embedding layer whose parameters and defined operations are common across all row-wise representation s is important in maintaining the ability of the resulting cross-table data similarity score generation machine learning model to infer similarity relationships between table data objects in a manner that can recognize symmetric relationships between those table data objects.

In some embodiments, the convolutional layer is configured to process each embedded row-wise representation for a table row to generate a context-aware row-wise representation for the table row. In some embodiments, using a convolutional layer whose parameters and defined operations are common across all embedded row-wise representation s is important in maintaining the ability of the resulting cross-table data similarity score generation machine learning model to infer similarity relationships between table data objects in a manner that can recognize symmetric relationships between those table data objects. In some embodiments, performing a convolutional operation as part of the operations of the cross-table data similarity score generation machine learning model is important to learning ordered features of data in the table rows.

In some embodiments, the regression layer is configured to process each context-aware row-wise representation for a pair of table data objects to (during training) generate inferred cross-table similarity scores or (during post-training inference) generate cross-table similarity scores. In some embodiments, during training of the cross-table data similarity score generation machine learning model using a pair of constructed table data objects, the regression layer is configured to process each context-aware row-wise representation for a table row of a constructed table data object in a pair of constructed table data objects to generate an inferred cross-table similarity score for the pair of constructed table data objects. In some embodiments, during a post-training inference using the cross-table data similarity score generation machine learning model, the regression layer is configured to process each context-aware row-wise representation for a table row of an input table data object in a pair of constructed table data objects to generate a cross-table similarity score for the pair of input table data objects. In some embodiments, the regression layer comprises: (i) a concatenation layer that is configured to aggregate/concatenate context-aware table row representations for a particular table data object in a pair of table data objects in order to generate a table-wise representation of the particular table data object, (ii) a fully-connected layer that is configured to generate an inferred fully-connected output based at least in part on each table-wise representation for a table data object in the pair of table data objects, and (iii) an output layer that is configured to generate the predicted cross-table data similarity score based at least in part on the inferred fully-connected output.

At step/operation 1703, the predictive data analysis computing entity 106 identifies a data matching table subset of the set of table data objects in the first database and the second database. In some embodiments, a table data object in the first database is in the data matching table subset if the table data object is associated with at least one table pair whose predicted cross-table data similarity score satisfies a predicted cross-table data similarity score threshold. In some embodiments, a table data object in the second database is in the data matching table subset if the table data object is associated with at least one table pair whose predicted cross-table data similarity score satisfies a predicted cross-table data similarity score threshold.

At step/operation 1704, the predictive data analysis computing entity 106 generates the predicted cross-database data similarity score for the first database and the second database based at least in part on the data matching table subset. In some embodiments, the predicted cross-database data similarity score for the first database and the second database is determined based at least in part on a ratio of a data matching table count of a data matching table subset (i.e., the count of all table data objects in the data matching subset) to a total number of table data objects across the first database and the second database. In some embodiments, the predicted cross-table data similarity score is determined based at least in part on the equation $$\frac{|A \cap B|}{|A \cup B| - |A \cap B|},$$

where A denotes the set of table data objects of the first database, B denotes the set of table data objects of the second database, and A∩B is the data matching table subset.

Returning to FIG. 16, at step/operation 1602, the predictive data analysis computing entity 106 determines a predicted cross-database column name similarity score for the first database and the second database. In some embodiments, the predicted cross-table similarity score is determined based at least in part on the equation $$\frac{|A \cap B|}{|A \cup B| - |A \cap B|},$$

where A denotes the set of table data objects of the first database, B denotes the set of table data objects of the second database, and a pair of table data objects are deemed to be in A∩B if the cross-table column name similarity score for the pair satisfies a cross-table column name similarity score threshold (e.g., exceeds a cross-table column name similarity score threshold).

In some embodiments, step/operation 1602 is performed in accordance with the process that is depicted in FIG. 18. The process that is depicted in FIG. 18 begins at step/operation 1801 when the predictive data analysis computing entity 106 identifies a set of table pairs, where each table pair is associated with a first table data object from the first database and a second table data object from the second database. In some embodiments, given m table data objects in the first database and n table data objects in the second database, the predictive data analysis computing entity 106 generates m*n table pairs.

At step/operation 1802, the predictive data analysis computing entity 106 determines a cross-table column name similarity score for each table pair. In some embodiments, to generate the cross-table column name similarity score for a table pair that includes a first table data object having a first set of table columns and a second table data object data object having a second set of table columns, the predictive data analysis computing entity 106: (i) identifies a set of table column pairs each including a first table column and a second table column; (ii) for each table column pair, determines a cross-column name similarity score between a column name of the first table column in the table column pair and the second table column in the table column pair; (iii) determines a name matching column set that comprises each table column that is associated with a table column pair whose cross-column name similarity score satisfies a cross-column name similarity score threshold (e.g., equals a cross-column name similarity score threshold of one); and (iv) determines the cross-table column name similarity score for the table pair based at least in part on the name matching column set.

In some embodiments, step/operation 1802 is performed in accordance with the process that is depicted in FIG. 19, which is an example process for generating a cross-table column name similarity score for a table pair. The process that is depicted in FIG. 19 begins at step/operation 1901 when the predictive data analysis computing entity 106 identifies a set of table column pairs each including a first table column from a first table data object in the table pair and a second table column in the table pair. In some embodiments, given m table columns in the first table data object and n table columns in the second table data object, the predictive data analysis computing entity 106 generates m*n table column pairs.

At step/operation 1902, the predictive data analysis computing entity 106 determines, for each table column pair, a cross-column name similarity score between a column name of the first table column in the table column pair and the second table column in the table column pair. In some embodiments, the cross-name column similarity score for between a column name of the first table column in the table column pair and the second table column in the table column pair is one if the two columns name are an exact match, and zero otherwise. In some embodiments, the cross-name column similarity score for between a column name of the first table column in the table column pair and the second table column in the table column pair is determined using a substring-based column name matching algorithm. In some embodiments, the cross-name column similarity score for between a column name of the first table column in the table column pair and the second table column in the table column pair is determined using a regular-expression-based column name matching algorithm.

At step/operation 1903, the predictive data analysis computing entity 106 identifies a name matching column set that comprises each table column that is associated with a table column pair whose cross-column name similarity score satisfies a cross-column name similarity score threshold. In some embodiments, the predictive data analysis computing entity 106 identifies a name matching column set that comprises each table column that is associated with a table column pair whose cross-column name similarity score equals a cross-column name similarity score threshold of one. In some embodiments, the predictive data analysis computing entity 106 identifies a name matching column set that comprises each table column that is associated with a table column pair whose cross-column name similarity score exceeds a cross-column name similarity score threshold of ninety percent.

At step/operation 1904, the predictive data analysis computing entity 106 determines the cross-table column name similarity score for the table pair based at least in part on the name matching column set. In some embodiments, the cross-table column name similarity score is determined based at least in part on the equation $$\frac{|A \cap B|}{|A \cup B| - |A \cap B|},$$

where A denotes the set of table columns in the first table data object associated with the table pair, B denotes the set of table columns in the second table data object associated with the table pair, and A∩B denotes the name matching column set (and thus |A∩B| denotes the count of table columns in the name matching column set, also referred to herein as a name matching column count).

Returning to FIG. 18, at step/operation 1803, the predictive data analysis computing entity 106 determines a name matching table subset of the set of table data objects in the first database and the second database. In some embodiments, a table data object in the first database is in the name matching table subset if the table data object associated with at least one table pair whose predicted cross-table column name similarity score satisfies a predicted cross-table column name similarity score threshold (e.g., a predicted cross-table column name similarity score threshold of ninety percent). In some embodiments, a table data object in the second database is in the name matching table subset if the table data object is associated with at least one table pair whose predicted cross-table column name similarity score satisfies a predicted cross-table column name similarity score threshold.

At step/operation 1804, the predictive data analysis computing entity 106 generates the predicted cross-database column name similarity score for the first database and the second database based at least in part on the name matching table subset. In some embodiments, the predicted cross-database column name similarity score for the first database and the second database is determined based at least in part on a ratio of a name matching table count of a name matching table subset (i.e., the count of all table data objects in the name matching subset) to a total number of table data objects across the first database and the second database. In some embodiments, the predicted cross-table column name similarity score is determined based at least in part on the equation $$\frac{|A \cap B|}{|A \cup B| - |A \cap B|},$$

where A denotes the set of table data objects of the first database, B denotes the set of table data objects of the second database, and A∩B is the name matching table subset.

Returning to FIG. 16, at step/operation 1603, the predictive data analysis computing entity 106 generates a predicted cross-database structural similarity score for the first database and the second database. In some embodiments, to generate the predicted cross-database structural similarity score for the first database and the second database, the predictive data analysis computing entity 106 generates a measure of similarity between a first graph-based database representation of the first database that describes one or more first referential key relationships across one or more first table columns of the first database as well as a second graph-based database representation of the second database that describes one or more second referential key relationships across one or more second table columns of the first database.

In some embodiments, step/operation 1603 may be performed in accordance with the process that is depicted in FIG. 20. The process that is depicted in FIG. 20 begins at step/operation 2001 when the predictive data analysis computing entity 106 generates a first graph-based database representation of the first database that describes one or more first referential key relationships across one or more first table columns of the first database as well as a second graph-based database representation of the second database that describes one or more second referential key relationships across one or more second table columns of the first database. In some embodiments, the graph-based database representation for a database includes a root node corresponding to the database, second-level nodes corresponding to the table data objects of the database that are connected to the root node, and leaf-level nodes corresponding to table columns of the table data objects that are connected to the second-level nodes.

An operational example of a graph-based database representation 2100 for a database 2111 is depicted in FIG. 21. As depicted in FIG. 21, the graph-based database representation 2100 includes: (i) the root node 2101 corresponding to the database 2111, (ii) second-level nodes 2102A-2102B corresponding to Table 1 and Table 2 of the database 2111, and (iii) leaf-level nodes corresponding to the table columns of Table 1 and Table 2, where each leaf-level node for a table column is connected to the second-level node of the table data object to which the table column belongs. As further depicted in FIG. 21, the graph-based database representation 2100 depicts the referential key relationship 2121 that is a PK-FK relationship between Col X of Table 1 and Col X of Table 2.

In some embodiments, step/operation 2001 may be performed in accordance with the process that is depicted in FIG. 22, which is an example process for generating a graph-based database representation of database. The process that is depicted in FIG. 22 begins at step/operation 2201 when the predictive data analysis computing entity 106 determines whether the database is associated with valid/reliable metadata. In some embodiments, metadata of a database is deemed valid/reliable if the metadata reliably describes PK-FK relationships across the table data objects of the database.

At step/operation 2202, in response to determining that the database is associated with valid/reliable metadata, the predictive data analysis computing entity 106 generates the graph-based database representation based at least in part on valid/reliable metadata. However, at step/operation 2203, in response to determining that the database is not associated with valid/reliable metadata, the predictive data analysis computing entity 106 generates the graph-based database representation by generating a an initial graph-based representation of the database using existing metadata of the database and using inferred referential key relationships that are inferred using a referential key relationship inference machine learning model to enrich the initial graph-based representation of the database.

In some embodiments, the referential key relationship inference machine learning model is configured to process column-wise representations for a potential primary key column of a database and the set of input columns of a table data object of the database to determine, for each input column: (i) a predicted primary key likelihood score describing an inferred likelihood that the input column is a primary key column for the table data object, and (ii) a predicted referential key relationship likelihood score describing an inferred likelihood that a PK-FK relationship exists between the potential primary key column and the input column.

An operational example of a referential key relationship inference machine learning model 2300 is depicted in FIGS. 23A and 23B. As depicted in FIGS. 23A and 23B, the referential key relationship inference machine learning model 2300 is configured to process the table data object 2301 and the potential primary key column 2302. The potential primary key column 2302 may be selected (e.g., randomly selected) from a set of potential primary key columns for the database. In some embodiments, a table column of a database is deemed a potential primary key column for the database if the table cell values of the data columns are deemed to be unique and/or distinct-valued across table rows.

As further depicted in FIGS. 23A and 23B, the referential key relationship inference machine learning model 2300 processes a set of column-wise representations 2303, which include each column-wise representation of the input column of the table data object 2301 as well as the column-wise representation of the potential primary key column 2302. In some embodiments, to generate a column-wise representation of a table column, the predictive data analysis computing entity 106 first generates an ordered representation of a set of characters that are deemed to occur within the table column, where the set of characters may include a set of explicit characters that may occur as part of the data in the table column as well as a set of inferred characters (e.g., a row separator character that may denote the transition from a table cell of a table column corresponding to a current table row to a table cell of the table column corresponding to a subsequent table row, a missing value character that describes missing values in a table cell of a table column, an unknown character that describes occurrence of characters not defined by the set of explicit characters as part of the data for a table column, and/or the like). Subsequent to generating the ordered representation of the set of characters that are deemed to occur within the table column, the predictive data analysis computing entity 106 may convert the ordered representation of the set of characters to a numerical sequence based at least in part on a character encoding scheme that assigns each character in the set of characters to a numerical value. The column-wise representation may in some embodiments be generated based at least in part on the noted numerical sequence.

As further depicted in FIGS. 23A and 23B, the referential key relationship inference machine learning model 2300 processes each column-wise representation using a shared embedding layer 2304 to generate an embedded column-wise representation, then processes each embedded column-wise representation using a shared bidirectional long-short term memory (LSTM) layer 2305 (or other sequential machine learning model) to generate a context-aware column-wise representation, then combines the embedded column-wise representations using a concatenation layer 2306 to generate a concatenation output, then processes the concatenation output using a fully-connected layer 2307 to generate model outputs. As depicted in FIGS. 23 and 23 Continued, the model outputs describe, for each input column of the table data object 2301: (i) a predicted primary key likelihood score describing an inferred likelihood that the input column is a primary key column for the table data object, and (ii) a predicted referential key relationship likelihood score describing an inferred likelihood that a PK-FK relationship exists between the potential primary key column 2302 and the input column.

In some embodiments, the referential key relationship inference machine learning model is trained using training data that is generated by inserting potential primary keys into table data objects of a training database if a randomly-generated insertion value indicates a one value and not inserting potential primary keys into table data objects if the randomly-generated insertion value indicates a zero value. In some embodiments, at each training data generation iteration, a potential primary key column having a fixed size (e.g., 10 thousand rows) as well as a table data object randomly-generated insertion value indicates are randomly selected and subsampled. Afterward, an insertion value is detected: if the insertion value indicates a one, then the potential primary key column is inserted into the table data object and corresponding annotation data are grounded. An operational example of such a training data generation is depicted in FIG. 24. As depicted in FIG. 24, the training data is generated based at least in part on a potential primary key column 2401, a table data object 2402, and an insertion value 2403.

In some embodiments, the referential key relationship inference machine learning model is a machine learning model that is configured to process column-wise representations for a potential primary key column of a database and the set of input columns of a table data object of the database to determine, for each input column: (i) a predicted primary key likelihood score describing an inferred likelihood that the input column is a primary key column for the table data object, and (ii) a predicted referential key relationship likelihood score describing an inferred likelihood that a primary-key foreign-key (PK-FK) relationship exists between the potential primary key column and the input column. In some embodiments, in response to determining that a database is associated with valid/reliable metadata, a predictive data analysis computing entity generates the graph-based database representation based at least in part on valid/reliable metadata. However, in response to determining that the database is not associated with valid/reliable metadata, a predictive data analysis computing entity generates the graph-based database representation by generating a an initial graph-based representation of the database using existing metadata of the database and using inferred referential key relationships that are inferred using a referential key relationship inference machine learning model to enrich the initial graph-based representation of the database.

Returning to FIG. 20, at step/operation 2002, the predictive data analysis computing entity 106 determines the predicted cross-database structural similarity score based at least in part on the first graph-based database representation and the second graph-based database representation. In some embodiments, a score of isomorphism is computed to calculate the similarity between the graphs. In some embodiments, the score of isomorphism is determined using the VF2 techniques described in Cordella et al., "A (Sub)graph Isomorphism Algorithm for Matching Large Graphs," IEEE Transactions on Pattern Analysis and Machine Intelligence (TPAMI) (Vol. 26, 1804), available online at https://ieeexplore.ieee.org/document/1323804.

Returning to FIG. 16, at step/operation 1604, the predictive data analysis computing entity 106 determines the predicted cross-database similarity score for the first database and the second database based at least in part on the predicted cross-database data similarity score, the predicted cross-database column name similarity score, and the predicted cross-database structural similarity score. In some embodiments, the predictive data analysis computing entity 106 combines the predicted cross-database data similarity score, the predicted cross-database column name similarity score, and the predicted cross-database structural similarity score to generate the predicted cross-database similarity score for the first database and the second database. In some embodiments, the predictive data analysis computing entity 106 adds the predicted cross-database data similarity score, the predicted cross-database column name similarity score, and the predicted cross-database structural similarity score to generate the predicted cross-database similarity score for the first database and the second database.

At step/operation 1605, the predictive data analysis computing entity 106 performs one or more prediction-based actions based at least in part on the predicted cross-database similarity score. Examples of prediction-based actions include removing duplicate/redundant versions of databases as determined based on predicted cross-database similarity score for pairs of databases.

In some embodiments, performing the prediction-based actions comprises causing display of a prediction output user interface that displays pairs of databases that are deemed to be duplicative based at least in part on the predicted cross-database similarity scores for the noted pairs. An operational example of such a prediction output user interface 2500 is depicted in FIG. 25. As depicted in FIG. 25, the prediction output user interface describes that DB1 and DB10 as well as DB22 and DB34 are deemed duplicative based at least in part on the predicted cross-database similarity scores.

Using the techniques described above, various embodiments of the present invention provide techniques for determining redundant databases as well as for determining similarities of databases. The provided techniques in turn enable end users of structured database systems to perform database search operations that enable them to detect similarities across database in a structured database system. This in turn reduces the need for end user operations to detect semantic correlations between database systems. Therefore, by reducing the need for end user operations to detect semantic correlations between databases by providing techniques for determining similarities between the noted database systems in structured databases in an efficient manner, various embodiments of the present invention reduce operational load on structured database systems by reducing the number of end-user queries to the noted structured database systems.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
identifying, by one or more processors, a first graph-based database representation of a first database, wherein the first graph-based database representation describes one or more first referential key relationships across one or more first table columns of the first database, wherein the first database is associated with a set of first database table data objects of a set of total table data objects;
identifying, by the one or more processors, a second graph-based database representation of a second database, wherein the second graph-based database representation describes one or more second referential key relationships across one or more second table columns of the second database, wherein the second database is associated with a set of second database table data objects of the set of total table data objects;
determining, by the one or more processors, a predicted cross-database structural similarity score for the first database and the second database based at least in part on a structural similarity between the first graph-based database representation of the first database and the second graph-based database representation of the second database;
determining, by the one or more processors, a predicted cross-database similarity score for the first database and the second database based at least in part on the predicted cross-database structural similarity score, wherein the predicted cross-database similarity score is adjusted based at least in part on a predicted cross-database data similarity score for the first database and the second database and the predicted cross-database data similarity score is determined based at least in part on a data matching table count of a data matching table subset of the set of total table data objects; and
initiating, by the one or more processors, a performance of a prediction-based action based at least in part on the predicted cross-database similarity score.

2. The computer-implemented method of claim 1, wherein:
each table pair comprising a first database table data object and a second database table data object is associated with a predicted cross-table data similarity score, each first table data object that is in the data matching table subset is associated with at least one first table pair whose predicted cross-table data similarity score satisfies a predicted cross-table data similarity score threshold, and each second table data object that is in the data matching table subset is associated with at least one second table pair whose predicted cross-table data similarity score satisfies the predicted cross-table data similarity score threshold.

3. The computer-implemented method of claim 1, wherein:
the predicted cross-database similarity score is adjusted based at least in part on a predicted cross-database column name similarity score for the first database and the second database, and
the predicted cross-database column name similarity score is determined based at least in part on a name matching table count of a name matching table subset of the set of total table data objects.

4. The computer-implemented method of claim 3, wherein:
each table pair comprising a first table data object and a second table data object is associated with a predicted cross-table column name similarity score,
each first table data object that is in the name matching table subset is associated with at least one first table pair whose predicted cross-table column name similarity score satisfies a predicted cross-table column name similarity score threshold, and
each second table data object that is in the name matching table subset is associated with at least one second table pair whose predicted cross-table column name similarity score satisfies the predicted cross-table column name similarity score threshold.

5. The computer-implemented method of claim 4, wherein determining the predicted cross-table column name similarity score for a table pair comprises:
for each table column pair comprising a first table column from the first table data object associated with the table column pair and a second table column from the second table data object associated with the table column pair, determining a cross-column name similarity score;
determining a name matching column set that comprises each table column that is associated with a first table column pair whose cross-column name similarity score satisfies a cross-column name similarity score threshold; and
determining the predicted cross-table column name similarity score for the table pair based at least in part on the name matching column set.

6. A computing system comprising one or more processors and memory including program code, the memory and the program code configured to, with the one or more processors, cause the computing system to at least:
identify a first graph-based database representation of a first database, wherein the first graph-based database representation describes one or more first referential key relationships across one or more first table columns of the first database, wherein the first database is associated with a set of first database table data objects of a set of total table data objects;
identify a second graph-based database representation of a second database, wherein the second graph-based database representation describes one or more second referential key relationships across one or more second table columns of the second database, wherein the second database is associated with a set of second database table data objects of the set of total table data objects;

determine a predicted cross-database structural similarity score for the first database and the second database based at least in part on a structural similarity between the first graph-based database representation of the first database and the second graph-based database representation of the second database;

determine a predicted cross-database similarity score for the first database and the second database based at least in part on the predicted cross-database structural similarity score, wherein the predicted cross-database similarity score is adjusted based at least in part on a predicted cross-database data similarity score for the first database and the second database and the predicted cross-database data similarity score is determined based at least in part on a data matching table count of a data matching table subset of the set of total table data objects; and initiate a performance of a prediction-based action based at least in part on the predicted cross-database similarity score.

7. The computing system of claim 6, wherein:
each table pair comprising a first database table data object and a second database table data object is associated with a predicted cross-table data similarity score,
each first table data object that is in the data matching table subset is associated with at least one first table pair whose predicted cross-table data similarity score satisfies a predicted cross-table data similarity score threshold, and
each second table data object that is in the data matching table subset is associated with at least one second table pair whose predicted cross-table data similarity score satisfies the predicted cross-table data similarity score threshold.

8. The computing system of claim 6, wherein:
the predicted cross-database similarity score is adjusted based at least in part on a predicted cross-database column name similarity score for the first database and the second database, and
the predicted cross-database column name similarity score is determined based at least in part on a name matching table count of a name matching table subset of the set of total table data objects.

9. The computing system of claim 8, wherein:
each table pair comprising a first table data object and a second table data object is associated with a predicted cross-table column name similarity score,
each first table data object that is in the name matching table subset is associated with at least one first table pair whose predicted cross-table column name similarity score satisfies a predicted cross-table column name similarity score threshold, and
each second table data object that is in the name matching table subset is associated with at least one second table pair whose predicted cross-table column name similarity score satisfies the predicted cross-table column name similarity score threshold.

10. The computing system of claim 9, wherein determining the predicted cross-table column name similarity score for a table pair comprises:
for each table column pair comprising a first table column from the first table data object associated with the table column pair and a second table column from the second table data object associated with the table column pair, determining a cross-column name similarity score;

determining a name matching column set that comprises each table column that is associated with a first table column pair whose cross-column name similarity score satisfies a cross-column name similarity score threshold; and determining the predicted cross-table column name similarity score for the table pair based at least in part on the name matching column set.

11. A computer program product comprising at least one non-transitory computer-readable storage medium having computer-readable program code portions stored therein, that when executed by one or more processors, cause the one or more processors to:

identify a first graph-based database representation of a first database, wherein the first graph-based database representation describes one or more first referential key relationships across one or more first table columns of the first database, wherein the first database is associated with a set of first database table data objects of a set of total table data objects;

identify a second graph-based database representation of a second database, wherein the second graph-based database representation describes one or more second referential key relationships across one or more second table columns of the second database, wherein the second database is associated with a set of second database table data objects of the set of total table data objects;

determine a predicted cross-database structural similarity score for the first database and the second database based at least in part on a structural similarity between the first graph-based database representation of the first database and the second graph-based database representation of the second database;

determine a predicted cross-database similarity score for the first database and the second database based at least in part on the predicted cross-database structural similarity score, wherein the predicted cross-database similarity score is adjusted based at least in part on a predicted cross-database data similarity score for the first database and the second database and the predicted cross-database data similarity score is determined based at least in part on a data matching table count of a data matching table subset of the set of total table data objects; and initiate a performance of a prediction-based action based at least in part on the predicted cross-database similarity score.

12. The computer program product of claim 11, wherein:

each table pair comprising a first database table data object and a second database table data object is associated with a predicted cross-table data similarity score, each first table data object that is in the data matching table subset is associated with at least one first table pair whose predicted cross-table data similarity score satisfies a predicted cross-table data similarity score threshold, and each second table data object that is in the data matching table subset is associated with at least one second table pair whose predicted cross-table data similarity score satisfies the predicted cross-table data similarity score threshold.

13. The computer program product of claim 11, wherein:

the predicted cross-database similarity score is adjusted based at least in part on a predicted cross-database column name similarity score for the first database and the second database, and the predicted cross-database column name similarity score is determined based at least in part on a name matching table count of a name matching table subset of the set of total table data objects.

14. The computer program product of claim 13, wherein:

each table pair comprising a first table data object and a second table data object is associated with a predicted cross-table column name similarity score, each first table data object that is in the name matching table subset is associated with at least one first table pair whose predicted cross-table column name similarity score satisfies a predicted cross-table column name similarity score threshold, and each second table data object that is in the name matching table subset is associated with at least one second table pair whose predicted cross-table column name similarity score satisfies the predicted cross-table column name similarity score threshold.

* * * * *